United States Patent
Boulet et al.

(10) Patent No.: US 9,702,438 B2
(45) Date of Patent: Jul. 11, 2017

(54) SEAMLESS TRANSMISSION SYSTEMS AND METHODS FOR ELECTRIC VEHICLES

(71) Applicant: THE ROYAL INSTITUTION FOR THE ADVANCEMENT OF LEARNING/MCGILL UNIVERSITY, Montreal (CA)

(72) Inventors: Benoit Boulet, Bouchervile (CA); Mir Saman Rahimi Mousavi, Montreal (CA); Hossein Vahid Alizadeh, Montreal (CA); Ali Pakniyat, Montreal (CA)

(73) Assignee: THE ROYAL INSTITUTION FOR THE ADVANCEMENT OF LEARNING/MCGILL UNIVERSITY (CA)

( * ) Notice: Subject to any disclaimer, the term of this patent is extended or adjusted under 35 U.S.C. 154(b) by 0 days.

(21) Appl. No.: 14/868,786

(22) Filed: Sep. 29, 2015

(65) Prior Publication Data
US 2016/0091059 A1    Mar. 31, 2016

Related U.S. Application Data

(60) Provisional application No. 62/056,710, filed on Sep. 29, 2014.

(30) Foreign Application Priority Data

Jun. 3, 2015   (CA) .................................. 2893535

(51) Int. Cl.
  *F16H 3/66*    (2006.01)
  *F16H 61/686*  (2006.01)
(52) U.S. Cl.
  CPC ............. *F16H 3/66* (2013.01); *F16H 61/686* (2013.01); *B60Y 2200/91* (2013.01);
  (Continued)

(58) Field of Classification Search
  None
  See application file for complete search history.

(56) References Cited

U.S. PATENT DOCUMENTS 1,786,158 A * 12/1930 Hawes ...................... F16H 1/00
                                                    475/329
4,531,428 A    7/1985 Windish
               (Continued)

FOREIGN PATENT DOCUMENTS

CN    2661479 Y    12/2004
CN    1818418 A    8/2006
             (Continued)

OTHER PUBLICATIONS

A Highly Efficient Two Speed Transmission for Electric Vehicles, EVS28, KINTEX, Korea, May 3-6, 2015, Saphir Faid.
(Continued)

*Primary Examiner* — Dirk Wright
(74) *Attorney, Agent, or Firm* — Norton Rose Fulbright Canada LLP

(57) ABSTRACT

Multi-speed transmission for electric vehicles (EVs) can reduce the size of the electric motor and provide an appropriate balance between efficiency and dynamic performance. Currently used multi-speed transmissions for EVs were initially designed for internal combustion engine (ICE) vehicles. Since ICEs cannot operate below certain speeds and their speed control during gear changes is not an easy task, the presence of clutches or torque convertors is inevitable for start-ups, idle running and gear changing. This, however, is not the case for EVs as electric motors are speed controllable in a wide range of operating speeds. Accordingly, transmissions without clutches or torque converters are established for EVs.

12 Claims, 16 Drawing Sheets

(52) U.S. Cl.
CPC ............... *F16H 2200/0034* (2013.01); *F16H 2200/2007* (2013.01); *F16H 2200/2035* (2013.01)

(56) References Cited

U.S. PATENT DOCUMENTS

| | | | |
|---|---|---|---|
| 5,285,111 | A | 2/1994 | Sherman |
| 5,435,794 | A | 7/1995 | Mori et al. |
| 5,577,973 | A * | 11/1996 | Schmidt ............ B60K 6/365 180/65.23 |
| 5,813,488 | A | 9/1998 | Weiss |
| 5,951,434 | A | 9/1999 | Richards et al. |
| 6,083,135 | A | 7/2000 | Baldwin et al. |
| 6,371,878 | B1 | 4/2002 | Bowen |
| 6,592,484 | B1 | 7/2003 | Tsai et al. |
| 7,137,919 | B2 | 11/2006 | Holmes |
| 7,479,080 | B2 * | 1/2009 | Usoro ................ B60K 6/365 180/65.25 |
| 2005/0130789 | A1 | 6/2005 | Samie et al. |
| 2008/0108474 | A1 | 5/2008 | Seo |
| 2009/0082171 | A1 | 3/2009 | Conlon et al. |
| 2010/0323837 | A1 | 12/2010 | Rosemeier et al. |
| 2014/0094335 | A1 | 4/2014 | Kim et al. |
| 2015/0005125 | A1 | 1/2015 | Hayashi et al. |

FOREIGN PATENT DOCUMENTS

| | | |
|---|---|---|
| CN | 101004204 A | 7/2007 |
| CN | 101020411 A | 8/2007 |
| CN | 101323243 A | 12/2008 |
| CN | 101780768 A | 7/2010 |
| CN | 201672014 U | 12/2010 |
| CN | 101985279 A | 3/2011 |
| CN | 201795003 U | 4/2011 |
| CN | 201856622 U | 6/2011 |
| CN | 202080112 U | 12/2011 |
| CN | 102152734 B | 4/2012 |
| CN | 202215683 U | 5/2012 |
| CN | 202507926 U | 10/2012 |
| CN | 202573765 U | 12/2012 |
| CN | 202707959 U | 1/2013 |
| CN | 202896299 U | 4/2013 |
| CN | 203032364 U | 7/2013 |
| CN | 203098765 U | 7/2013 |
| EP | 0537693 A1 | 10/1992 |
| JP | 10311386 A | 11/1999 |

OTHER PUBLICATIONS

Fundamentals of a Power Splitting Driving Chain for Large Wind Turbines, Rui Xiaoming, Li Lin and Li Ximei, Proceedings of the 7th World Congress on Intelligent Control and Automation, Jun. 25-27, 2008, Chongqing, China.

Design and Development of an Eco-Friendly Automatic Gearbox for Automobile Applications, Vijayan Surumurthy Iyer and Nikos E. Mastorakis, pp. 62-70.

An Analyzing Method of Coupled Modes in Multi-Stage Planetary Gear System, Wei Sun, Xin Ding, Jing Wei, Xinglong Hu, and Qingguo Wang, KSPE and Springer 2014, 2358 / Nov. 2014 International Journal of Precision Engineering and Manufacturing vol. 15, No. 11.

Design of two-speed transmission for electric vehicle, Jou. of Korean Soc. of Mechanical Technology, vol. 11(3) 2009, C. H. Kook, J. T. Kim and S. H. OH.

Instantaneously Optimized Controller for a Multimode Hybrid Electric Vehicle, Dominik Karbowski, Jason Kwon, Namdoo Kim, Aymeric Rousseau, 2010 SAE International.

Design of 2-Speed Transmission for Electric Commercial Vehicle, J. W. Shin, J. O. Kim, J. Y. Choi and S. H. OH, International Journal of Automotive Technology, vol. 15, No. 1, pp. 145-150 (2014).

2Gen 2 Volt Transmission Operating Modes Explained, Jeff N, Patrick Groeneveld and George Bower, Feb. 20, 2015.

* cited by examiner

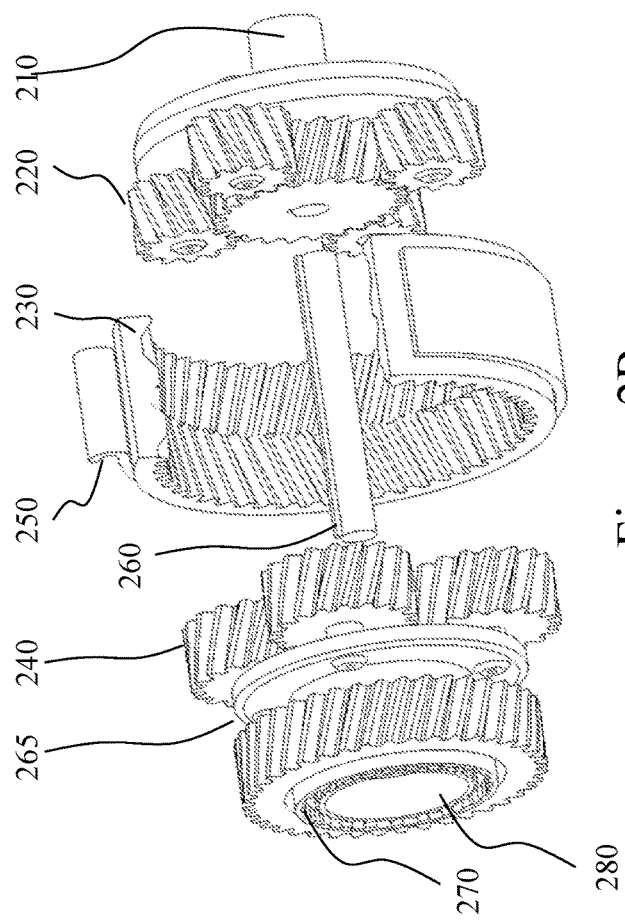
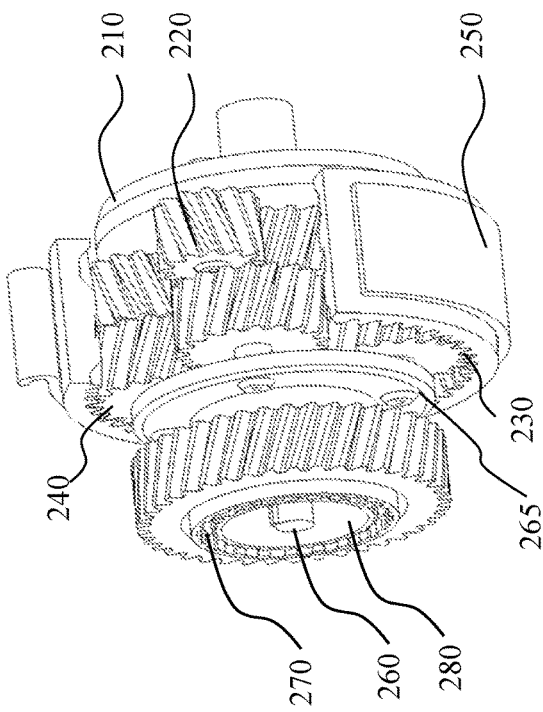
Figure 2B
Figure 2C

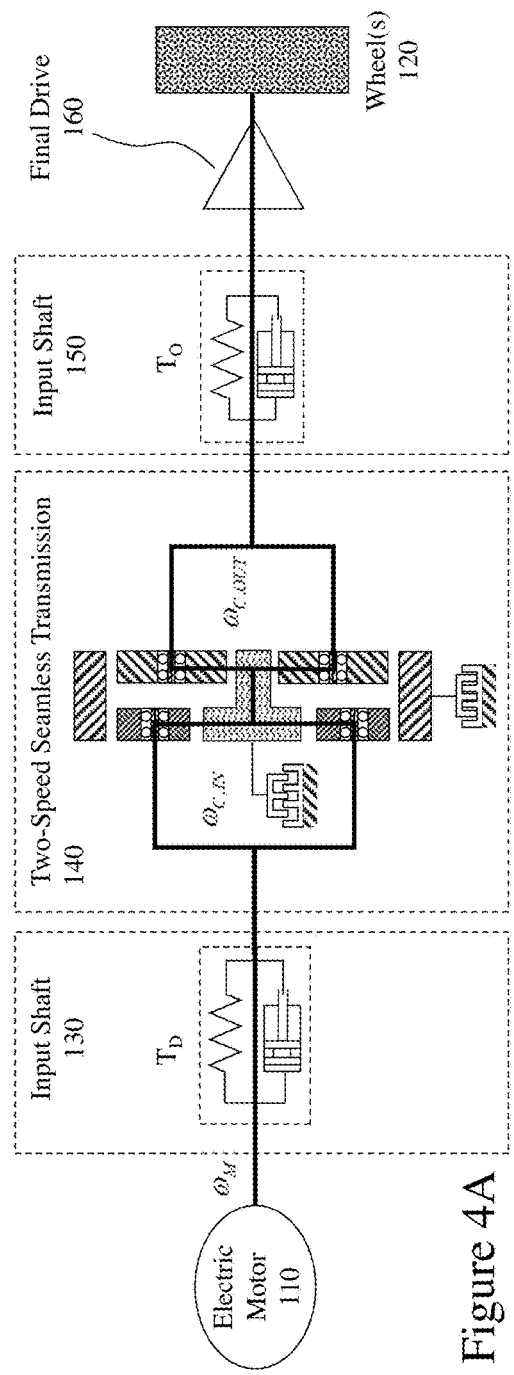
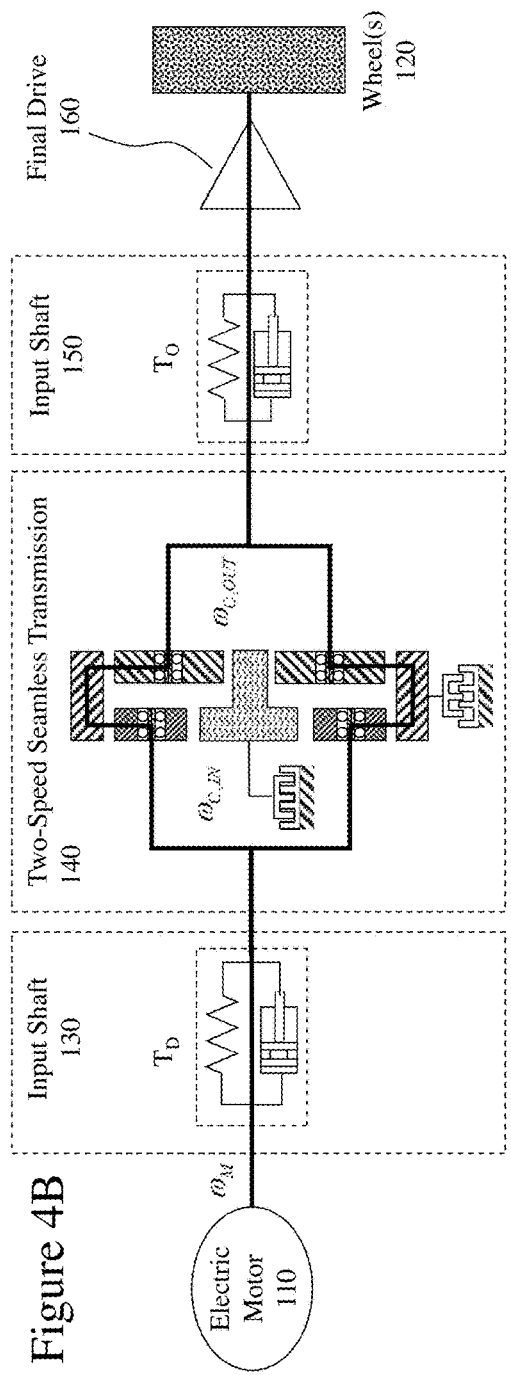
Figure 4A
Figure 4B

700B

700A

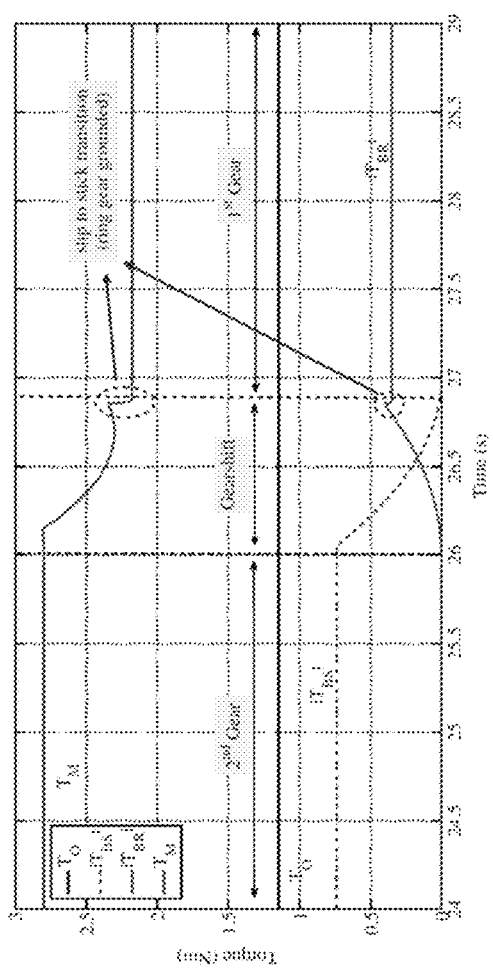
Figure 18
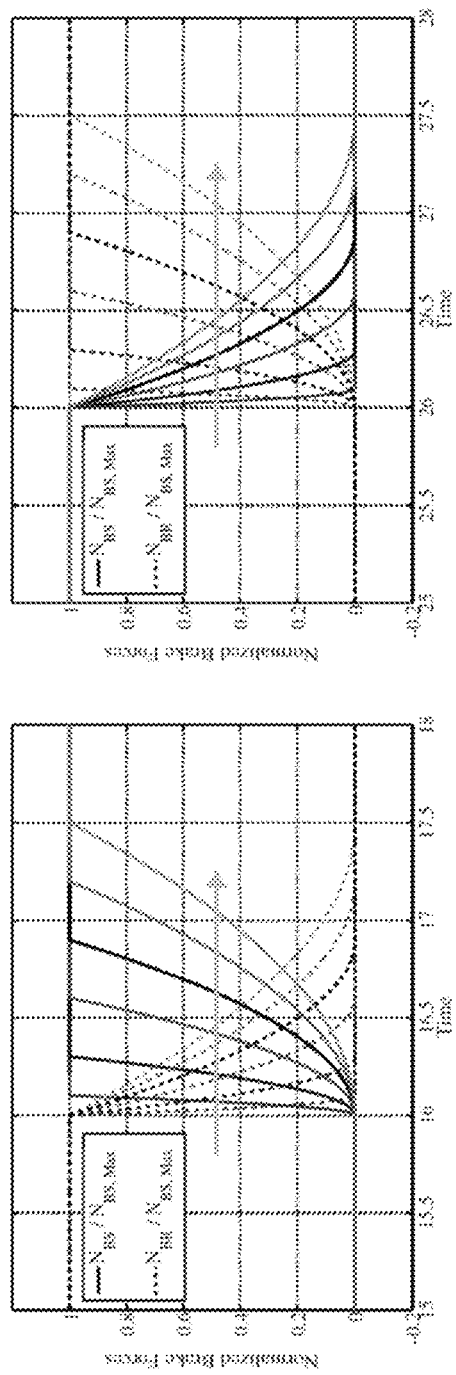
Figure 19A
Figure 19B

SEAMLESS TRANSMISSION SYSTEMS AND METHODS FOR ELECTRIC VEHICLES

CROSS-REFERENCE TO RELATED APPLICATIONS

This patent application also claims the benefit of U.S. Provisional Patent Applications 62/056,710 filed Sep. 29, and Canadian Patent Application 2,893,535 filed Jun. 3, 2015, the entire contents of which are incorporated herein by reference.

FIELD OF THE INVENTION

This invention relates to transmission systems and more particularly to two-speed seamless transmissions designed specifically for electric vehicles.

BACKGROUND OF THE INVENTION

Increasing fuel cost and environmental concerns have pushed the automotive industry to gradually replace internal combustion engine (ICE) vehicles with hybrid electric (HEV) and fully electric vehicles (EV). However, the energy density of electric batteries is much less than that of fossil fuels. Thus, by changing the source of power from internal combustion engine to electric motor, it is necessary to minimize the losses in the driveline in order to maximize the range of EVs. Pure electric vehicles in the market are mostly equipped with a single ratio transmission with a trade-off between efficiency and dynamic performance, such as maximum speed, acceleration, and gradability.

Research indicates that using a multi-speed transmission for EVs can reduce the size of the electric motor and provide an appropriate balance between the efficiency and the dynamic performance. Currently used multi-speed transmissions for EVs such as Automated Manual Transmission (AMT), Automatic Transmission (AT), Dual Clutch Transmission (DCT), and Continuously Variable Transmission (CVT) were initially designed for ICE vehicles. Since ICEs cannot operate below certain speeds and their speed control during gear changes is not an easy task, the presence of clutches or torque convertors is inevitable for start-ups, idle running and gear changing. This, however, is not the case for EVs as electric motors are speed-controllable in a wide range of operating speeds.

Accordingly, it would be beneficial to exploit the characteristics of electric motors to design novel transmissions for EVs.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations in the prior art relating to transmission systems and more particularly to two-speed seamless transmissions designed specifically for electric vehicles.

In accordance with an embodiment of the invention there is provided a two-speed transmission for a vehicle comprising:
an input shaft
an output shaft
a first planetary gearbox including a first sun gear, a first ring gear, first planet gears interconnecting the first sun gear and the first ring gear, and a second planet carrier interconnecting the first planet gears and the input shaft;
a second planetary gearbox including a second sun gear, a second ring gear, second planet gears interconnecting the second sun gear and the second ring gear, and a second planet carrier interconnecting the second planet gears and the output shaft;
a sun gear brake allowing the first and second sun gears to be prevented from rotating; and
a ring gear brake allowing the first and second ring gears to be prevented from rotating; wherein
the first and second sun gears are interconnected, the first and second ring gears are interconnected, and control of the sun gear brake and the ring gear brake allows the control on the speed ratio of the transmission.

In accordance with an embodiment of the invention there is provided a method of shifting gear for a vehicle comprising:
providing a transmission comprising:
 an input shaft
 an output shaft
 a first planetary gearbox including a first sun gear, a first ring gear, first planet gears interconnecting the first sun gear and the first ring gear, and a second planet carrier interconnecting the first planet gears and the input shaft;
 a second planetary gearbox including a second sun gear, a second ring gear, second planet gears interconnecting the second sun gear and the second ring gear, and a second planet carrier interconnecting the second planet gears and the output shaft;
 a sun gear brake allowing the first and second sun gears to be prevented from rotating; and
 a ring gear brake allowing the first and second ring gears to be prevented from rotating; and
providing a controller for controlling the sun gear brake and ring gear brake to set the speed ratio of the transmission; wherein
the first and second sun gears are interconnected and the first and second ring gears are interconnected.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 2A-2C depict an exploded 3D view schematic of a two-speed transmission according to an embodiment of the invention;

FIGS. 4A and 4B depict schematically the power transmission path in both configurations for a two-speed transmission according to an embodiment of the invention;

FIG. 18 depicts simulated brake friction torque and motor torque for a downshift operation for a two-speed transmission according to an embodiment of the invention;

FIGS. 19A to 19F depict the effect of engagement and disengagement intervals of the oncoming and off-going brakes on the shifting time and energy dissipation for a two-speed transmission according to an embodiment of the invention;

DETAILED DESCRIPTION

Figure 1:
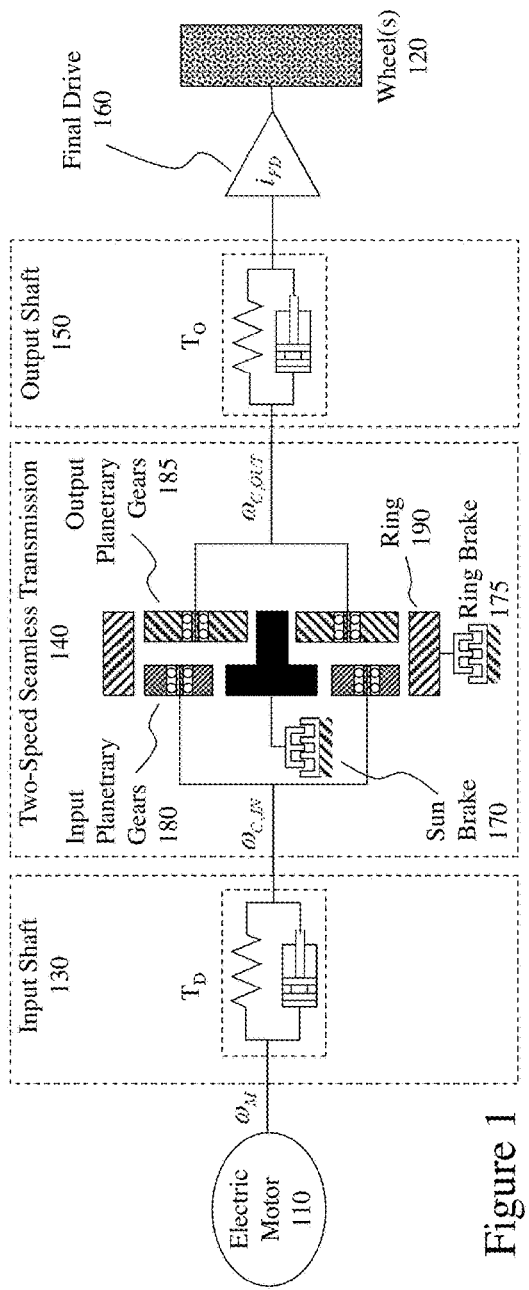
FIG. 1 depicts schematically the driveline of an EV equipped with a two-speed transmission according to an embodiment of the invention.

The present invention is directed to transmission systems and more particularly to two-speed seamless transmissions designed specifically for electric vehicles.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

1. Overview

Automated Manual Transmission (AMT) is of great interest because of its lower weight and higher efficiency in comparison with other types of transmissions such as Automatic Transmission (AT), Dual Clutch Transmission (DCT), and Continuously Variable Transmission (CVT). However, the torque interruption during gear changing operation, which comes from the disengagement and re-engagement of the transmission to the electric motor or engine, reduces passenger comfort and lifetime of the synchronizers. Gear shifting and drivability improvement of a clutchless AMT for EVs have been addressed within the prior art via a sliding mode controller that reduces the gap of torque interruption (shifting time). An alternate approach within the prior art exploits a combination of state-feedback and $H_\infty$ robust controllers to provide an optimal speed synchronization. A comparison between a fixed-ratio transmission and a novel two-speed I-AMT (Inverse Automated Manual Transmission) with rear-mounted dry clutches was made by Gao et al in "Gear Ratio Optimization and Shift Control of 2-Speed I-AMT in Electric Vehicle" (Mech. Syste. Signal Process., Vol. 50, pp. 615-631) where dynamic programming is used to design the optimal gear ratios for the first and second gears in order to minimize the energy consumption for urban and suburban drive cycles. It is indicated that efficiency and dynamic performance of a two-speed AMT transmission with optimal gear ratios are much better than those of a single speed transmission.

In contrast to AMT, DCT has the special feature of eliminating the output torque interruption during gear shifts, but also has lower efficiency and higher weight. A two-speed DCT transmission for electric vehicles was presented by Zhu et al. in "Two-Speed DCT Electric Powertain Shifting Control and Rig Testing" (Afv. Mech. Eng., Vol. 5, pp. 1-10) where an open-loop shifting controller was presented. The results demonstrate that the vibration of the output torque is not considerable and the torque hole is almost eliminated.

Continuously variable transmissions (CVTs) provide continuous change of the gear ratio. The principle used by CVT transmission is to keep the source of power (electric motor or engine) at the most efficient point while changing the gear ratio in order to get different combinations of the torque and speed. However, since the set of efficient operating points for electric motors is rich enough, a multiplicity of gear ratios or a continuously variable transmission are not necessary for EVs.

Similar to DCTs, planetary-gear-based ATs have the ability to eliminate the output torque interruption during the gear shift operation. However, due to the existence of torque convertors and hydraulic systems in ATs, they generally have lower efficiency in comparison with other types of transmissions and they are not of great interest for EVs. Although the presence of a torque convertor provides passenger comfort and increases drivability, the output power of the transmission can be decreased due to internal slippage inside the torque convertor when it is not completely locked-up.

In contrast to these prior art approaches, the inventors propose a compact two-speed clutchless seamless transmission to meet the conflicting requirements of efficiency, performance, and drivability for EVs. Transmissions according to embodiments of the invention may exploit a dual-stage planetary gear set with common ring and common sun gears. The ratio of the pitch diameter of the ring gear to the sun gear in the input and output sides are different in order to provide two different gear ratios. Beneficially, the planetary gear trains within embodiments of the invention support high power density due to the torque being distributed over several gears which provides a compact design. Embodiments of the invention also exploit a pair of friction brakes to direct the flow of power during gearshift through the control of the speed of the sun and the ring gears such that a fast and smooth gear change can be achieved. Embodiments of the invention provide for a transmission that is perpetually connected to the electric motor and final drive and, accordingly, embodiments of the invention may be implemented without a clutch or torque converter to disconnect this mechanical coupling.

Embodiments of the invention may exploit gear shift control through torque and inertia phases via conventional control strategies such as those employed for ATs and DCTs. The control of the proposed transmission through these phases has been studied by the inventors, see for example Rahimi Mousavi and Boulet in "Modeling, Simulation and Control of a Seamless Two-Speed Automated Transmission for Electric Vehicles" (IEEE Am. Control Conf., 2014, pp. 3826-3831). As a result of the perpetual connectedness of the power transmission paths in transmissions according to embodiments of the invention, torques and speeds are always dependent on each other through the transmitted power. Accordingly, the control strategy may be further enhanced such that the control strategy would not be required to be distinctly separated into the torque and inertia phases. Accordingly, this basis forms the design criteria for controller designs according to embodiments of the invention described within this specification.

Now referring to FIG. 1, there is depicted a schematic view of the driveline of an electric vehicle equipped with the proposed two-speed transmission. As can be seen in FIG. 1, the input shaft 130 of the transmission is the carrier of the first stage input planetary gears 180 of the two-stage, two-speed seamless transmission 140, which is attached to an electric motor 110. The output of the mechanism is the carrier of the second stage output planetary gears 185 which are connected to the final drive 160 and therein the wheels 120 by the output shaft 150. Two different gear ratios can be obtained by braking the sun or the ring gears with either the sun brake 170 or ring brake 175. As will become evident from the description, below the control of the brakes can be implemented in a manner that the gear shifting would be seamless and without any torque interruption.

Figure 2A:
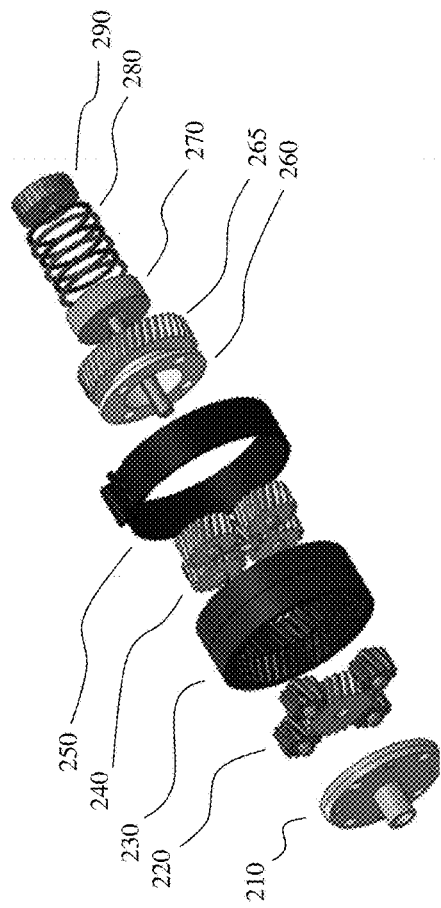

Now referring to FIGS. 2A-2C there is depicted an exploded three-dimensional (3D) assembly a two-speed seamless transmission (2SPST) according to an embodiment of the invention. Within the following description, for brevity, the terms sun, ring and planet(s) are used instead of sun gear, ring gear and planet gears, respectively, within the planetary gear set(s). Accordingly, as depicted the 2SPST comprises:

Input carrier 210;
First stage (or input) planetary gear set 220;
Common ring gear 230;
Second stage (or output) planetary gear set 240;
Band brake 250;
Common shaft for sun gears 260;
Output carrier 265;
Outer hub for sun brake 270;
Friction plates 280; and
Inner hub for sun brake 290.

The kinematic analysis of the two-stage planetary gear set is discussed below in Section 2 wherein the achievable gear ratios of transmissions according to embodiments of the invention are presented as a function of the ratios of the first and second planetary gear sets. In Section 3, a dynamic model of the driveline of an electric vehicle equipped with transmissions according to embodiments of the invention is developed for subsequent use in the controller design in Section 4 wherein control problems are formulated and the Pontryagin Minimum Principle (PMP) is employed to design controls for minimizing the shifting time and the energy dissipation caused by the internal brakes during the gear change while keeping the output torque and the output speed of the driveline constant. Based on the results of these controllers according to embodiments of the invention, a back-stepping method is applied to design a closed-loop asymptotically stable controller which copes with the actuator limitations. Finally, simulation and experimental results are provided in Section 5 to validate the performance of the controller and the seamless behavior of the transmissions according to embodiments of the invention.

2. Kinematic Analysis and Gear Ratios

2.1. Kinematic Equations

In this section, the kinematic equations of the dual-stage planetary gear set and the achievable gear ratios are studied in order to be utilized in the dynamic modeling of the proposed transmission. The kinematic relations between the components of a single stage planetary gear set, such as Carrier (C), Sun (S), Planets (P), and Ring (R) are given by Equations (1) and (2) where $r_S$, $r_P$, $r_R$ are the pitch radii of the sun, planet, and ring, respectively. The parameter $r_C$ is the radius of the circle on which the planets are mounted and the variables $\omega_S$, $\omega_P$, $\omega_R$ are the angular velocities of the sun, planets, ring, and carrier, respectively.

$$r_R \omega_R = r_P \omega_P + r_C \omega_C;\ r_R = r_P + r_C \qquad (1)$$

$$r_C \omega_C = r_P \omega_P + r_S \omega_S;\ r_C = r_P + r_S \qquad (2)$$

$$(r_R + r_S)\omega_C = r_S \omega_S + r_R \omega_R \qquad (3)$$

$$R_1 := \left(\frac{r_R}{r_S}\right)_{1st\_Stage};\ R_2 := \left(\frac{r_R}{r_S}\right)_{2nd\_Stage} \qquad (4)$$

By eliminating $\omega_P$ and $r_P$ from Equations (1) and (2), the kinematic relation between the ring, the sun, and the carrier is given by Equation (3). For simplification of the formulation, the ratio of the pitch radius of the ring ($r_R$) to the sun ($r_S$) for the first and the second stages of the planetary gear sets are defined by Equation (4). It is obvious that $R_1$ and $R_2$ are greater than 1 since the pitch radius of the ring is always greater than the sun's.

During the gear changing process, the transmission has two degrees of freedom, and accordingly it is required to select two generalized coordinates to derive the equations of motion. The generalized coordinates are chosen to be $q=[\theta_S \theta_R]^T$, where $\theta_S$ and $\theta_R$ are the angular displacements of the sun and the ring, respectively and accordingly, all the angular velocities are expressed as functions of $\omega_S$ and $\omega_R$.

From Equations (1) to (4) the angular velocities of the input carrier ($\omega_{C,IN}$), the output carrier ($\omega_{C,OUT}$), the input planets ($\omega_{P,IN}$), and the output planets ($\omega_{P,OUT}$) can be expressed as angular velocities of the sun ($\omega_S$) and the ring ($\omega_R$) as given in Equation (5).

$$\begin{cases} \omega_{C,IN} = \dfrac{R_1 \omega_R + \omega_S}{(R_1 + 1)}; \omega_{C,OUT} = \dfrac{R_2 \omega_R + \omega_S}{(R_2 + 1)} \\ \omega_{P,IN} = \dfrac{R_1 \omega_R - \omega_S}{(R_1 - 1)}; \omega_{P,OUT} = \dfrac{R_2 \omega_R - \omega_S}{(R_2 - 1)} \end{cases} \quad (5)$$

2.2 Gear Ratios

According to Equation set (5), the gear ratio of the transmission (the ratio of the input speed to the output speed) can be expressed by Equation (6). According to Equation (6), three different gear ratios are achievable as given by Equations (7) through (9) for the conditions that the ring is completely grounded ($\omega_R=0$), the sun ring is completely ground ($\omega_S=0$) and if neither the sun nor ring is grounded ($\omega_R \neq 0$ and $\omega_S \neq 0$).

$$\frac{\omega_{C,IN}}{\omega_{C,OUT}} = \frac{(R_2+1)(\omega_S + R_1 \omega_R)}{(R_1+1)(\omega_S + R_2 \omega_R)} \quad (6)$$

$$\frac{\omega_{C,IN}}{\omega_{C,OUT}} = \frac{(R_2+1)}{(R_1+1)} = GR_1 \quad (7)$$

$$\frac{\omega_{C,IN}}{\omega_{C,OUT}} = \frac{(R_2+1)R_1}{(R_1+1)R_2} = GR_2 \quad (8)$$

$$\frac{\omega_{C,IN}}{\omega_{C,OUT}} = \frac{(R_2+1)(\omega_S + R_1 \omega_R)}{(R_1+1)(\omega_S + R_2 \omega_R)} = GR_3 \quad (9)$$

Figure 3:
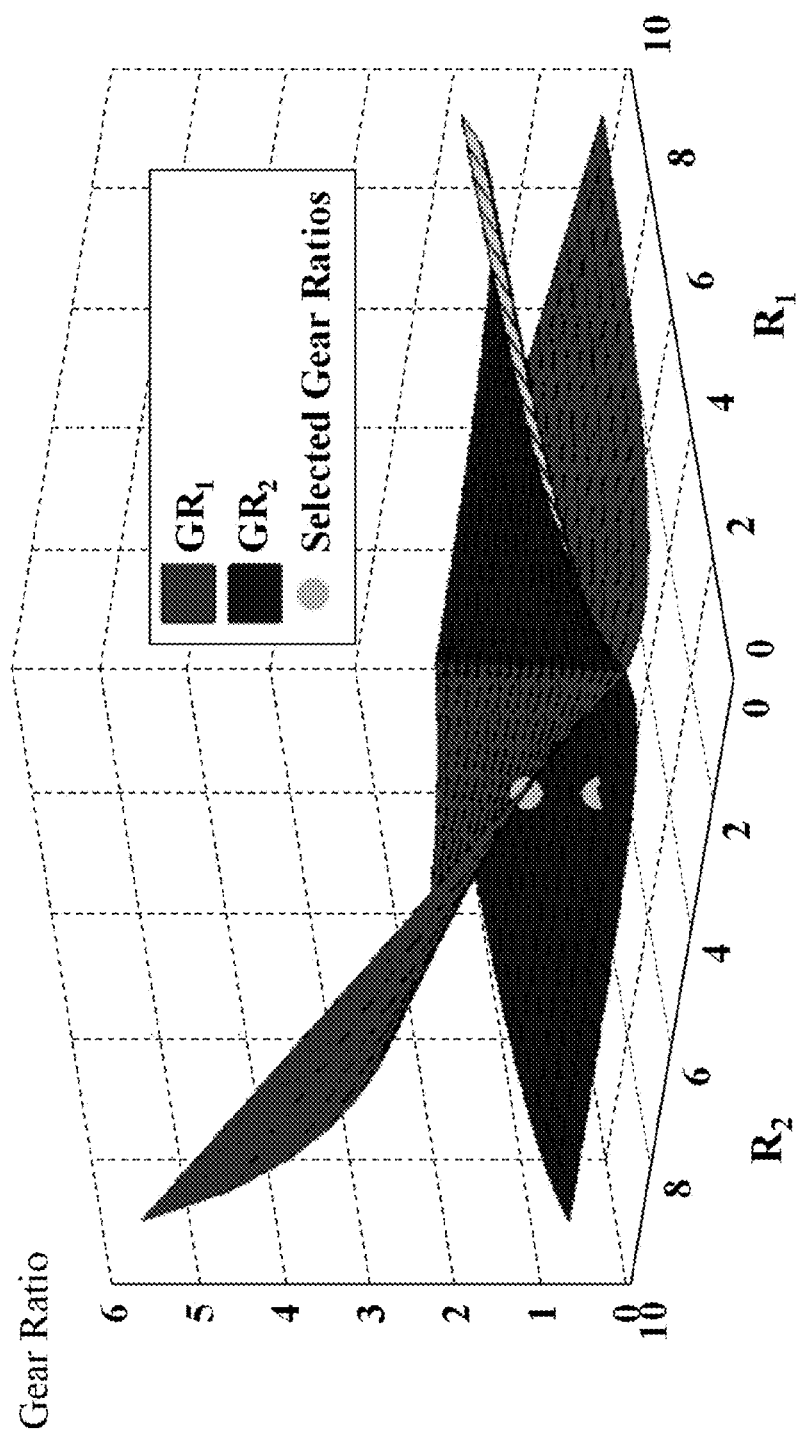
FIG. 3 depicts the achievable gear ratios by varying the radii of the first and second gear sets for a two-speed transmission according to an embodiment of the invention.

Here, $GR_1$ and $GR_2$ are considered as the first and the second gear ratios where $GR_T$ is the transient gear ratio from the first gear ratio to the second one during the gear shifting process. Although the gear ratios are dependent, it is possible to solve Equation (7) and (8) for $R_1$ and $R_2$ in order to get the desired $GR_1$ and $GR_2$. Referring to FIG. 3, there are depicted achievable $GR_1$ and $GR_2$ by varying $R_1$ and $R_2$ from 1 to 10, and the selected gear ratios described within this specification.

Within the prior art the effect of gear ratio selection on the efficiency and dynamic performance was presented in respect of genetic algorithms in order to determine the optimal range of gear ratios for a pure electric vehicle with a 75 kW permanent magnet AC motor and equipped with a two-speed transmission. These results showed that the dynamic performance was highly dependent on the gear ratio selection whilst efficiency was not considerably affected by the transmission gear ratios. Improving the dynamic performance of EVs is an advantage of multi-speed transmissions compared to single speed ones.

From FIG. 3 it can be seen that except for the line $R_1=R_2$, one of the gear ratios expressed in Equations (7) and (8) is always overdrive and the other one is underdrive. Within this specification the inventors selected $R_1=2$ and $R_2=4$ to provide $GR_1=1.667$ and $GR_2=0.833$ which are used in both simulation and experimental analyses within this specification. These gear ratios are multiplied by the final drive ratio $i_{FD}$ to give the overall gear ratios of the driveline in the vehicle. Hence, the desired overall gear ratios can be obtained by appropriate selection of $R_1$, $R_2$, and $i_{FD}=5$ the resulting overall gear ratios are $GR_1=8.333$ and $GR_2=4.167$, which lie within the optimal ranges for the two-speed electric vehicle reported within the prior art.

3. Dynamical Modeling of the Driveline

As evident from FIG. 1, the driveline is comprised of an electric motor 110, an input drive shaft 130 (which is considered to be a flexible input shaft), a two-speed seamless transmission (2SPST), an output drive shaft 150 (which is considered to be a flexible output shaft), a final drive 160, and wheels 120. In this section, the dynamic model of the driveline is presented in order to be employed for the controller design purposes.

3.1. Electric Motor and Flexible Input Shaft 2

The electric motor is the only source of power in this driveline. The dynamics of the motor can be expressed by using the torque balance equation given by Equation (10) where $J_M$ and $T_M$ are the inertia and the electromagnetic torque of the motor, respectively. Here, $T_d$ is the drive torque which can be considered as the load on the motor and can be calculated using Equation (11) where $K_d$ and $B_d$ are the equivalent torsional stiffness and damping constants of the flexible input shaft and $\theta_M$ and $\theta_{C,IN}$ are the angular displacements of the motor and the input carrier. By differentiating Equation (11) with respect to time and assuming the damping term to be negligible, the torque rate of the drive torque can be established from Equation (12).

$$\dot{\omega}_M = \frac{T_M - T_d}{J_M} \quad (10)$$

$$T_d = K_d(\theta_M - \theta_{C,IN}) + B_d(\omega_M - \omega_{C,IN}) \quad (11)$$

$$\dot{T}_d \approx K_d(\omega_M - \omega_{C,IN}) \quad (12)$$

3.2. Two-Speed Seamless Transmission

By considering the generalized coordinates to be $q=[\theta_S \theta_R]^T$, where $\theta_S$ and $\theta_R$ are the angular displacements of the sun and the ring gears, and by considering the gears as rigid bodies, the principle of virtual work can be applied to derive the dynamic equation of the two-speed transmission. The principle of virtual work states that for a system with in number of generalized coordinates $q_k$, $k \in \{1, \ldots, m\}$ then we obtain Equation (13) where $L=T-V$ is the Lagrangian, T and V are the total kinetic and potential energy of the system respectively. $Q_k^{appl,nc}$ and $\delta q_k$ are the non-conservative applied torques and virtual displacements, respectively.

$$\sum_{k=1}^m \left[ Q_k^{appl,nc} - \frac{d}{dt}\left(\frac{\delta L}{\delta \dot{q}_k}\right) + \frac{\delta L}{\delta q_k} \right] \delta q_k = 0 \quad (13)$$

By considering the center of mass of the system as the reference point for the gravitational energy and by considering all the mechanical parts inside the transmission to be rigid, the total potential energy of the system remains constant (V=0). The kinetic energy of the system consists of the kinetic energy of the input and output carriers, the ring, the sun, the four input and four output planets and is given by Equation (14).

$$T = \frac{1}{2} I_{C,IN} \omega_{C,IN}^2 + \frac{1}{2} I_{C,OUT} \omega_{C,OUT}^2 + \quad (14)$$

-continued $$\frac{1}{2}I_R\omega_R^2 + 4\left(\frac{1}{2}I_{P,IN}\omega_{P,IN}^2 + \frac{1}{2}m_{P,IN}r_{C,IN}^2\omega_{C,IN}^2\right) +$$

$$\frac{1}{2}I_S\omega_S^2 + 4\left(\frac{1}{2}I_{P,OUT}\omega_{P,OUT}^2 + \frac{1}{2}m_{P,OUT}r_{C,OUT}^2\omega_{C,OUT}^2\right)$$

In Equation (14) $I_{C,IN}$, $I_{C,OUT}$, $I_S$, $I_R$, $I_{P,IN}$, $I_{P,OUT}$ are the moment of inertia of the input carrier, output carrier, sun, ring, input planets, and output planets, respectively and $m_{P,IN}$ and $m_{P,OUT}$ are the mass of the input and output planets. In terms of the generalized coordinates introduced earlier, the kinetic energy is written as Equation (15).

$$T = \frac{1}{2}(I_{C,IN} + 4m_{P,IN}r_{C,IN}^2)\left(\frac{\omega_S^2 + R_1^2\omega_R^2 + 2R_1\omega_R\omega_S}{(R_1+1)^2}\right) + \tag{15}$$
$$\frac{1}{2}(I_{C,OUT} + 4m_{P,OUT}r_{C,OUT}^2)\left(\frac{\omega_S^2 + R_2^2\omega_R^2 + 2R_2\omega_R\omega_S}{(R_2+1)^2}\right) +$$
$$4\left\{\frac{1}{2}I_{P,IN}\left(\frac{\omega_S^2 + R_1^2\omega_R^2 - 2R_1\omega_R\omega_S}{(R_1-1)^2}\right)\right\} + \frac{1}{2}I_S\omega_S^2 +$$
$$4\left\{\frac{1}{2}I_{P,OUT}\left(\frac{\omega_S^2 + R_2^2\omega_R^2 - 2R_2\omega_R\omega_S}{(R_2-1)^2}\right)\right\} + \frac{1}{2}I_R\omega_R^2$$

By using the principle of virtual work in Equation (13), the equations of motion for the two generalized coordinates $q=[\theta_S \theta_R]^T$ can be written as Equation (16) in which the coefficients are listed in Table 1. Within Equation (16) $C_S$, $C_R$, $T_{Sf}$, and $T_{Rf}$ are the coefficients of the viscous and Coulomb friction of the transmission measured from experimental tests and $T_O$ is the output torque of the transmission.

$$\begin{cases} \dot{\omega}_S = \frac{1}{a}(T_{BS}\tau - T_{BR}\lambda - \omega_S C_S \tau + \\ \quad \omega_R C_R \lambda + cT_d - dT_O + T_{Sf}\tau - T_{Rf}\lambda) \\ \dot{\omega}_R = \frac{1}{a}(T_{BR}\gamma - T_{BS}\lambda + \omega_S C_S \lambda - \\ \quad \omega_R C_R \gamma + eT_d - fT_O + T_{Rf}\lambda - T_{Sf}\lambda) \end{cases} \tag{16}$$

It should be noted that $T_{BS}$ and $T_{BR}$ are the braking torques of the sun and ring gears.

TABLE 1

Coefficients of the Dynamic Modelling of the Two-Speed Transmission $$\alpha = \frac{(I_{C,IN} + 4m_{P,IN}r_{C,IN}^2)}{(R_1+1)^2}$$

$$\beta = \frac{(I_{C,OUT} + 4m_{P,OUT}r_{C,OUT}^2)}{(R_2+1)^2}$$

$$\gamma = [I_S + \alpha + \beta + \phi + \psi]$$

$$\tau = [I_R + (\alpha + \phi)R_1^2 + (\beta + \psi)R_2^2]$$

$$\lambda = [(\alpha - \phi)R_1 + (\beta - \psi)R_2]$$

$$\psi = \frac{4I_{P,OUT}}{(R_2-1)^2}$$

$$a = (\gamma\tau - \lambda^2)$$

$$c = \frac{\tau - R_1\lambda}{R_1+1}$$

$$d = \frac{\tau - R_2\lambda}{R_2+1}$$

$$e = \frac{\gamma R_1 - \lambda}{R_1+1}$$

TABLE 1-continued

Coefficients of the Dynamic Modelling of the Two-Speed Transmission $$\phi = \frac{4I_{P,IN}}{(R_1-1)^2} \qquad f = \frac{\gamma R_2 - \lambda}{R_2+1}$$

In the inventive transmission system established by the inventors within embodiments of the invention, the brake of the sun may be of the multi-plate brake type. Thus, the relation between the normal applied force on the plates and the resulting torque is given by Equation (17) where $\mu_P$ is the coefficient of friction between the plates, $N_{BS}$ is the applied normal brake force to the plates and n is the number of friction surfaces. The inner and outer radii of the multi-plate brake are denoted by $R_1$ and $R_O$, respectively. The brake of the ring within embodiments of the invention may be of the band brake type, resulting in the relation between the applied normal force at the end of the band and the resulting torque in the form of Equation (18) where $N_{BR}$ is the force applied at the end of the band, $R_D$ is the radius of the drum brake, $\mu_P$ is the coefficient of friction between band and drum and $\theta_D$ is the angle of wrap.

$$T_{BS} = -\mu_P N_{BS} n\left(\frac{2}{3}\right)\left(\frac{R_O^3 - R_I^3}{R_O^2 - R_I^2}\right)\text{sign}(\omega_S); N_{BS} \geq 0 \tag{17}$$

$$\begin{cases} T_{BR} = -N_{BR}R_D(e^{\mu_D\theta_D} - 1); \omega_R \geq 0, N_{BR} \geq 0 \\ T_{BR} = N_{BR}R_D(1 - e^{-\mu_D\theta_D}); \omega_R \leq 0, N_{BR} \geq 0 \end{cases} \tag{18}$$

For the band brake, the positive direction of rotation is considered as the energizing mode of the band brake in order to avoid the undesirable drag torque in both brakes, particularly in the multi-plate brake. These may be designed to be of the dry type as known in the prior art.

Now referring to FIGS. 4A and 4B there are depicted schematically the engaging and disengaging of the brakes of sun ($T_{BS}$) and ring ($T_{BR}$), thereby changing the path of power transmission and consequently the gear ratio.

3.3. Vehicle Dynamics and Flexible Output Shaft

By using a lumped mass method and the torque balance equation, the dynamics of the vehicle can be expressed as given by Equation (19) where $J_V$ is the inertia of the vehicle and wheels, $i_{fd}$ is the final drive ratio and $T_V$ is the resisting torque on the vehicle that can be calculated from the relation given by Equation (20) where $R_W$, $\theta_{road}$, $K_r$, $m_v$, $v_x$, $\rho$, $C_d$ and $A_f$ indicate wheel radius, road angle, tire rolling resistance, vehicle mass, vehicle velocity, air density, aerodynamic drag coefficient and vehicle frontal area, respectively. Slip of the tires is neglected so the geometric relation $v_x = R_W \omega_W$ can be considered between the angular velocity of the wheels and the speed of the vehicle for straight motion. The output torque of the transmission, denoted $T_O$, can be calculated from Equation (21), where K and B are the equivalent torsional stiffness and damping constants of the flexible output shaft and $\theta_{C,OUT}$ and $\theta_W$ are the angular displacements of the output carrier and the wheels, respectively. By differentiating Equation (21) with respect to time and assuming the damping term to be negligible, then the torque rate of the output torque of the transmission is given by Equation (22).

$$\dot{\omega}_W = \frac{T_O i_{fd} - T_V}{J_V} \tag{19}$$

-continued $$T_V = R_W \left( \frac{1}{2} \rho v_x^2 C_d A_f + m_v g \sin(\theta_{road}) + K_f m_v g \cos(\theta_{road}) \right) \quad (20)$$

$$T_O = K_O(\theta_{C,OUT} - i_{fd}\theta_w) + B_O(\omega_{C,OUT} - i_{fd}\omega_w) \quad (21)$$

$$\dot{T}_O \approx K_O(\omega_{C,OUT} - i_{fd}\omega_W) \quad (22)$$

By collecting Equations (10), (12), (16), (19) and (22) together, the full state dynamics of the system are given by Equations (23A) to (23F) respectively.

$$\dot{\omega}_M = \frac{-1}{J_M} T_d + \frac{1}{J_M} T_M \quad (23A)$$

$$\dot{T}_d = K_d \omega_M - \frac{K_d}{R_1 + 1}\omega_S - \frac{K_d R_1}{R_1 + 1}\omega_R \quad (23B)$$

$$\dot{w}_S = \quad (23C)$$
$$\frac{-C_S \tau}{a}\omega_S + \frac{C_R \lambda}{a}\omega_R + \frac{c}{a}T_d - \frac{d}{a}T_O + \frac{\tau}{a}(T_{BS} + T_{Sf}) - \frac{\lambda}{a}(T_{BR} + T_{Rf})$$

$$\dot{w}_R = \quad (23D)$$
$$\frac{C_S \lambda}{a}\omega_S - \frac{C_R \gamma}{a}\omega_R + \frac{e}{a}T_d - \frac{f}{a}T_O - \frac{\lambda}{a}(T_{BS} + T_{Sf}) + \frac{\gamma}{a}(T_{BR} + T_{Rf})$$

$$\dot{T}_O = -i_{fd}K_O\omega_W + \frac{K_O}{R_2+1}\omega_S + \frac{K_O R_2}{R_2+1}\omega_R \quad (23E)$$

$$\dot{\omega}_W = -\frac{1}{J_V}T_V + \frac{i_{fd}}{J_V}T_O \quad (23F)$$

4. Controller Design

As described supra, the 2-speed seamless transmission according to embodiments of the invention has the ability to change the gear while transmitting the power from the motor to the wheels without any torque or speed interruption in the output. This goal, together with the minimization of the shifting time and the energy dissipation caused by internal brakes of the transmission during gear changing, is formulated in the control frame-work in Sections 4.1 and 4.2 which forms the basis for the general control strategy in Section 4.3.

4.1. Preliminaries for the Controller Design

For simplicity of notation, the problem is formulated for the case when the resisting torque from the road ($T_V$) on the vehicle is constant during the gear shifting and accordingly the output torque and output speed of the driveline are desired to remain constant during the gear changing. These requirements are interpreted as $\dot{\omega}_W=0$ and $\dot{T}_O=0$ and hence from Equations (5) and (23) these control requirements are expressed as Equations (24) and (25). The constant value for $\omega_{C,OUT}$ in Equation (25) necessarily requires Equations (26) and (27).

$$T_O = \frac{1}{i_{fd}} T_V \quad (24)$$

$$\omega_{C,OUT} = i_{fd}\omega_W \quad (25)$$

$$\omega_R = \left(\frac{R_2+1}{R_2}\right)i_{fd}\omega_W - \frac{1}{R_2}\omega_S \quad (26)$$

$$\dot{\omega}_{C,OUT} = 0 \Rightarrow \dot{\omega}_R = \frac{-1}{R_2}\dot{\omega}_S \quad (27)$$

The objective of the control is to go from an initial gear into a target gear (i.e., from Equations (7) to (8) through Equation (9) and vice versa) by means of engaging and releasing the brakes. For the states $\omega_S$ and $\omega_R$ in Equation (23) the initial and terminal conditions can be expressed by Equation (28).

$$\begin{bmatrix} \omega_S \\ \omega_R \end{bmatrix} = \begin{bmatrix} \omega_{S(@GR1)} \\ 0 \end{bmatrix} \iff \begin{bmatrix} \omega_S \\ \omega_R \end{bmatrix} = \begin{bmatrix} 0 \\ \omega_{R(@GR2)} \end{bmatrix} \quad (28)$$

From Equations (27) and (23) we can derive Equation (29) which when re-arranged yields Equation (30).

$$\frac{(\lambda R_2 - \tau)(C_S \omega_S - T_{BS}) - (\gamma R_2 - \lambda)(C_R \omega_R - T_{BR}) +}{(c + eR_2)T_d - (\lambda R_2 - \tau)T_{Sf} + (\gamma R_2 - \lambda)T_{Rf} - (d + fR_2)T_O} = 0 \quad (29)$$

$$T_d = \frac{1}{c+eR_2}\begin{pmatrix} (\lambda R_2 - \tau)T_{BS} + (\lambda - \gamma R_2)T_{BR} + (\tau - \gamma R_2)C_S\omega_S + \\ (\gamma R_2 - \lambda)C_R\omega_R + (\lambda R_2 - \tau)T_{Sf} - (\gamma R_2 - \lambda)T_{Rf} + \\ (d + fR_2)T_O \end{pmatrix} \quad (30)$$

The controllability of Equation (23) implies that there exists a motor torque $T_M$ such that Equation (30) is satisfied for all instants, see Section 4.3. Thus, among the control inputs, the motor torque $T_M$ is reserved for satisfying Equation (30), and hence the number of independent control inputs is reduced to two, i.e., the brakes of the sun and ring $T_{BS}$ and $T_{BR}$, respectively. Substituting $T_d$ from Equation (30) and $\omega_R$ from Equation (5) into the equation for $\dot{\omega}_S$ in Equation (23) results in Equation (31A).

$$\dot{\omega}_S = \quad (31A)$$
$$\frac{1}{a(c+eR_2)}\begin{pmatrix} -[(e\tau+c\lambda)C_SR_2+(e\lambda+c\gamma)C_R]\omega_S - (de-cf)R_2T_O \\ (1+R_2)(e\lambda+c\gamma)C_R\omega_{C,OUT}+(e\tau+c\lambda)R_2T_{BS} - \\ (e\lambda+c\gamma)R_2T_{BR}+(e\tau+c\lambda)R_2T_{Sf}-(e\lambda+c\gamma)R_2T_{Rf} \end{pmatrix}$$

For the ease of notation, the coefficients in Equation (31A) are denoted by Equation (31B).

$$\begin{cases} A_S = \frac{(e\tau+c\lambda)C_sR_2+(e\lambda+c\gamma)C_R}{a(c+eR_2)} \\ B_{S1} = \frac{(e\tau+c\lambda)R_2}{a(c+eR_2)}; B_{S2} = \frac{(e\lambda+c\gamma)R_2}{a(c+eR_2)} \\ G_S = \frac{1}{a(c+eR_2)}\begin{pmatrix}(1+R_2)(e\lambda+c\gamma)C_R\omega_{C,OUT}-(de-cf)R_2T_O+ \\ (e\tau+c\lambda)R_2T_{Sf}-(e\tau+c\lambda)R_2T_{Rj}\end{pmatrix} \end{cases} \quad (31B)$$

Accordingly, Equation (31) is represented by Equation (32) with the initial and the terminal conditions from Equation (28) given by Equation (33) for the upshift and Equation (34) for the downshift process. The times $t_o$ and $t_f$ indicate the initial and terminal instances of the gear changing process.

$$\dot{\omega}_S = A_S\omega_S + B_{S1}T_{BS} - B_{S2}T_{BR} + G_S \quad (32)$$

$$\omega_S(t_O)\omega_{S(@GR1)}; \omega_S(t_f)=0 \quad (33)$$

$$\omega_S(t_O)=0; \omega_S(t_f)=\omega_{S(@GR2)} \quad (34)$$

It is assumed within this analysis that during the gear changing process the ring and the sun are rotating in the positive directions and hence according to Equations (17) and (18) it can be concluded that the conditions defined by Equation (35) apply.

$$-|T_{BS}^{max}| \le T_{BS} \le 0; \quad -|T_{BR}^{max}| \le T_{BR} \le 0 \tag{35}$$

4.2. Control Problem

The Pontryagin Minimum Principle states that for a system with the dynamics defined by Equation (36) and the cost function defined by Equation (37) there exists an adjoint process p* for the control input u* and along the corresponding optimal trajectory x* such that the conditions established by Equation (38) apply for all admissible u(t), where the Hamiltonian H is defined by Equation (39) and the terminal boundary condition defined by Equation (40) is satisfied.

$$\dot{x}(t) = f(x(t), u(t), t) \tag{36}$$

$$J(u) = \int_{t_0}^{t_f} l(x(t), u(t), t) dt + h(x(t_f), t_f) \tag{37}$$

$$\begin{cases} \dot{x}^*(t) = \frac{\delta H}{\delta p}(x^*(t), u^*(t), p^*(t), t) \\ \dot{p}^*(t) = \frac{\delta H}{\delta x}(x^*(t), u^*(t), p^*(t), t) \\ H(x^*(t), u^*(t), p^*(t), t) \le H(x^*(t), u(t), p^*(t), t) \end{cases} \tag{38}$$

$$H(x(t), u(t), p(t), t) \triangleq l(x(t), u(t), t) + p^T(t)f(x(t), u(t), t) \tag{39}$$

$$\left[H(x^*(t_f), u^*(t_f), p^*(t_f), t_f) + \frac{\delta h}{\delta t}(x^*(t_f), t_f)\right]\delta t_f + \left[\frac{\delta h}{\delta t}(x^*(t_f), t_f) - p^*(t_f)\right]^T \delta x_f = 0 \tag{40}$$

4.2.1 The Minimum Shifting Time Problem

The cost functional for the minimum time control problem can be written as Equation (41) where $t_f$ being the first time after $t_O$ that the terminal condition in Equations (33) and (34) occurs. According to Equations (32) and (39), the Hamiltonian is formed as defined in Equation (42). Based upon the Pontryagin Minimum Principle, the dynamic of the adjoint process p* is governed by Equation (43) and the Hamiltonian minimizations condition results in Equation (44) where $-|T_{BS}^{MAX}| \le T_{BS} \le 0$ and Equation (45) for all $-|T_{BR}^{MAX}| \le T_{BR} \le 0$. Since this is a fixed terminal value problem, from Equation (40), the terminal value for the adjoint process is free and Equation (46) results at the final time $t_f$. This also gives Equation (46) for all $t \in [t_0, t_f]$. Hence, according to Equation (42) we obtain Equation (47) for all $t \in [t_0, t_f]$. Solving Equation (43) results in Equation (48).

$$J(u) = \int_{t_0}^{t_f} 1 dt \tag{41}$$

$$H(\omega_S, p, T_{BR}, T_{BS}) = 1 + p(-A_S \omega_S + B_{S1}T_{BS} - B_{S2}T_{BR} + G_S) \tag{42}$$

$$\dot{p}^* = -\frac{\delta H(\omega_S, p^*, T_{BS}, T_{BR})}{\delta \omega_S} = p^* A_S \tag{43}$$

$$H(\omega_S^*, p^*, T_{BS}^*, T_{BR}^*) \le H(\omega_S^*, p^*, T_{BS}, T_{BR}^*) \tag{44}$$

$$H(\omega_S^*, p^*, T_{BS}, T_{BR}^*) \le H(\omega_S^*, p^*, T_{BS}^*, T_{BR}) \tag{45}$$

$$H(\omega_S^*, p^*, T_{BS}^*, T_{BR}^*) = 0 \tag{46}$$

$$p^*(-A_S \omega_S^* + B_{S1}T_{BS}^* - B_{S2}T_{BR}^* + G_S) = -1 \tag{47}$$

$$p^*(t) = p^*(t_f)e^{A_S(t_f - t)} \tag{48}$$

Since the angular velocity of the sun is decreasing in the upshift process ($\dot{\omega}_S \le 0$), Equation (47) requires that $p^*(t_0) > 0$ and hence $p^*(t) > 0$ for all $t \in [t_0, t_f]$. Thus the Hamiltonian minimization Equations (44) and (45) yield $T^*_{BS} = -|T_{BS}^{MAX}|$ and $T^*_{BR} = 0$, respectively. In a similar way it can be argued that the Hamiltonian minimization Equations (44) and (45) yield $T^*_{BS} = 0$ and $T^*_{BR} = -|T_{BR}^{MAX}|$ for the downshift process.

4.2.2. Minimum Energy Dissipation Controller

For the system (Equation (32)) with the initial and terminal conditions (Equations (33) and (34)), the minimum energy dissipation control problem is equivalent to Equation (49). Replacing $\omega_R$ from Equation (5) gives the cost functional as given by Equation (50) that results in the Hamiltonian in the form of Equation (51). Based on the Minimum Principle, the dynamics for the optimal adjoint process p* is given by Equation (52). The Hamiltonian minimization condition with respect to $T_{BS}$ gives Equation (53) for all $-|T_{BS}^{MAX}| \le T_{BS} \le 0$ and the Hamiltonian minimization with respect to $T_{BR}$ gives Equation (54) for all $-|T_{BR}^{MAX}| \le T_{BR} \le 0$. With the fixed terminal values specified in Equations (33) and (34) the terminal condition in Equation (40) results in Equation (55) which, similar to the minimum shifting time case, also holds for all $t \in [t_0, t_f]$. Noting that $\omega^*_S \ge 0$ for all $t \in [t_0, t_f]$ and using Equation (56), the optimality conditions (Equations (53) and (54)) result in $T^*_{BS} = -|T_{BS}^{MAX}|$, $T^*_{BR} = 0$ when $p^* \ge (\omega^*_S/B_{S1})$ for the upshift operation and $T^*_{BS} = 0$, $T^*_{BR} = -|T_{BR}^{MAX}|$ when $p^* \le (\omega_R/B_{S2})$ for the downshift process. The existence of the adjoint process Equation (52) lying within the region determined by $p^* \ge (\omega^*_S/B_{S1})$ and $p^* \le (\omega^*_R/B_{S2})$ for the downshift process verifies that the minimum energy dissipation controller is equivalent to the minimum shifting time controller.

$$\min_u \int_{t_{Ot}}^{t_f} -(T_{BS} + T_{Sf})\omega_S - (T_{BR} + T_{Rf})\omega_R dt \tag{49}$$

$$\min_u \int_{t_{Ot}}^{t_f} \left(-\left(T_{BS} + T_{Sf} - \frac{1}{R_2}(T_{BR} + T_{Rf})\right)\omega_s - \left(1 + \frac{1}{R_2}\right)(T_{BR} + T_{Sf})\omega_{C,OUT}\right)dt \tag{50}$$

$$H(\omega_S, p, T_{BS}, T_{BR}) = \tag{51}$$

$$p(-A_S \omega_S + B_{S1}T_{BS} - B_{S2}T_{BR} + G_S) - \left(T_{BS} + T_{Sf} - \frac{1}{R_2}(T_{BR} + T_{Rf})\right)\omega_s - \left(1 + \frac{1}{R_2}\right)(T_{BR} + T_{Sf})\omega_{C,OUT}$$

$$\dot{p}^* = \frac{\delta H(\omega_S, p^*, T_{BS}, T_{BR})}{\delta \omega_S} = p^* A_S + \left(T_{BS} + T_{Sf} - \frac{1}{R_2}(T_{BR} + T_{Rf})\right) \tag{52}$$

$$(p^* B_{S1} - \omega_S^*)T_{BS}^* \le (p^* B_{S1} - \omega_S^*)T_{BS} \tag{53}$$

$$\left(-p^* B_{S2} + \frac{\omega_S^*}{R_2} - \left(1 + \frac{1}{R_2}\right)\omega_{C,OUT}\right)T_{BR}^* \le \tag{54}$$

$$\left(-p^* B_{S2} + \frac{\omega_S^*}{R_2} - \left(1 + \frac{1}{R_2}\right)\omega_{C,OUT}\right)T_{BR}$$

$$H(\omega_S^*, p^*, T_{BS}^*, T_{BR}^*) = 0 \tag{55}$$

$$\frac{\omega_S^*}{R_2} - \left(1 + \frac{1}{R_2}\right)\omega_{C,OUT} \equiv -\omega_R^* \le 0 \tag{56}$$

4.3 Back-Stepping Controller Design

Implementation of the optimal control law designed in the previous section is rigorous in practice due to sudden engagement and disengagement of the brakes which eventuate in sudden variation of the motor torque. Therefore in this section, based on the results of the optimal controller, a feasible controller is designed by replacing the sudden engagement and disengagement of the brakes with smooth variations of the braking torques that can be provided by the actuators. The back-stepping approach is utilized due to the non-linear and cascade structure of dynamical Equation (23). The back-stepping technique provides a stabilizing feedback law with the simultaneous proof of the stability.

In order to start the recursive procedure of the back-stepping controller design, the dynamic equations of $\omega_W$ and $T_O$ in Equation (23) are rewritten according to the kinematic Equation (5) yielding Equation (57).

$$\begin{cases} \dot{\omega}_W = \frac{-1}{J_V} T_V + \frac{i_{fd}}{J_V} T_o \\ \dot{T}_O = -i_{fd} K_O \omega_W + K_O \omega_{C,OUT} \end{cases} \quad (57)$$

Choosing the first Control Lyapunov Function (CLF) as that given in Equation (58) and the virtual control as Equation (59) then the time derivative of Equation (58) becomes Equation (60) which is clearly negative definite and implies asymptotical stability of $\omega_W$. Now considering the first back-stepping change of variables as follows (the back-stepping variables appear in higher order terms by exploiting the modularity of the method) in Equation (61) this yields Equation (62).

$$V_1(\omega_W) = \frac{1}{2}(\omega_W - \omega_{W,DES})^2 \quad (58)$$

$$\Phi = T_{O,DES} = \frac{J_V}{i_{fd}}\left(\frac{1}{J_V}T_V - K_I(\omega_W - \omega_{W,DES})\right) \quad (59)$$

$$\dot{V}_1(\omega_W) = -K_I(\omega_W - \omega_{W,DES})^2 \quad (60)$$

$$\overline{\omega} = T_O - T_{O,DES} = T_O - \Phi \quad (61)$$

$$T_O = \overline{\omega} + \Phi \Rightarrow \dot{T}_O = \dot{\overline{\omega}} + \dot{\Phi} \quad (62)$$

In Equations (57), (61) and (62) the first back-stepping variable can be seen in the equations as given by Equation (63).

$$\begin{cases} \dot{\omega}_W = -K_I(\omega_W - \omega_{W,DES}) + \frac{i_{fd}}{J_V}\overline{\omega} \\ \dot{\overline{\omega}} = -i_{fd}K_O\omega_W + K_O\omega_{C,OUT} - \dot{\Phi} \end{cases} \quad (63)$$

By incorporation of $\overline{\omega}$ in the Lyapunov function, then we obtain Equation (64) and then considering a CLF for the second order sub-system of Equation (63) as that in Equation (65) then the Lyapunov function time derivative becomes negative definite in Equation (66) and clearly ensures that $(\omega_W,\overline{\omega})=(\omega_{W,DES},0)$ is asymptotically stable.

$$V_2(\omega_W, \overline{\omega}) = \frac{1}{2}(\omega_W - \omega_{W,DES})^2 + \frac{1}{2}(\overline{\omega})^2 \quad (64)$$

$$\Omega = \omega_{C,OUT,DES} = -\frac{i_{fd}}{K_O J_V}(\omega_W - \omega_{W,DES}) + i_{fd}\omega_W + \frac{1}{K_O}\dot{\Phi} - \frac{K_{II}}{K_O}\overline{\omega} \quad (65)$$

$$\dot{V}_2(\omega_W, \overline{\omega}) = -K_I(\omega_W - \omega_{W,DES})^2 - K_{II}\overline{\omega}^2 \quad (66)$$

In order to proceed with the second back-step, the second change of variable is considered as given by Equation (67). Accordingly, Equations (23), (63), and (65) give Equation (68) with Equation (69).

$$\sigma = \omega_{C,OUT} - \omega_{C,OUT,DES} = \omega_{C,OUT} - \Omega \quad (67)$$

$$\begin{cases} \dot{\omega}_W = -K_I(\omega_W - \omega_{W,DES}) + \frac{i_{fd}}{J_V}\overline{\omega} \\ \dot{\overline{\omega}} = -K_{II}\overline{\omega} - \frac{i_{fd}}{J_V}(\omega_W - \omega_{W,DES}) + K_O\sigma \\ \dot{\sigma} = A_\sigma + B_\sigma T_d + C_\sigma(\overline{\omega} + \Phi) - \dot{\Omega} \end{cases} \quad (68)$$

$$\begin{cases} A_\sigma = \frac{1}{a(R_2+1)}((R_2\gamma - \gamma)T_{BR} + (\tau - R_2\lambda)T_{BS} + (R_2\lambda - \tau)C_S\omega_S + \\ \qquad (\lambda - R_2\gamma)C_R\omega_R + (R_2\gamma - \lambda)T_{Rf} + (\tau - R_2\lambda)T_{Sf}) \\ B_\sigma = \frac{R_2e + c}{a(R_2+1)} \\ C_\sigma = -\frac{R_2f + d}{a(R_2+1)} \end{cases} \quad (69)$$

A candidate Lyapunov function to ensure the stability of the system Equation (68) is given by Equation (70) wherein applying the virtual control law yields Equation (71) which makes the Lyapunov derivative negative definite as evident in Equation (72) and clearly ensures the asymptotical stability of the system Equation (68) around the point $(\omega_W,\overline{\omega},\sigma)$ $(\omega_{W,DES},0,0)$. Now considering the next back-stepping change of variables as given by Equation (73) then the system Equation (68) becomes according to Equation (23) that given in Equation (74).

$$V_3 = \frac{1}{2}(\omega_W - \omega_{W,DES})^2 + \frac{1}{2}(\overline{\omega})^2 + \frac{1}{2}(\sigma)^2 \quad (70)$$

$$\Psi = T_{d,DES} = \frac{1}{B_\sigma}\left(-A_\sigma - K_O\overline{\omega} - C_\sigma(\overline{\omega} + \Phi) - \dot{\Omega} - K_{III}\sigma\right) \quad (71)$$

$$\dot{V}_3 = -K_I(\omega_W - \omega_{W,DES})^2 - K_{II}(\overline{\omega})^2 - K_{III}(\sigma)^2 \quad (72)$$

$$\zeta = T_d - T_{d,des} = T_d - \Psi \Rightarrow \dot{\zeta} = \dot{T}_d - \dot{\Psi} \quad (73)$$

$$\begin{cases} \dot{\omega}_W = -K_I(\omega_W - \omega_{W,DES}) + \frac{i_{fd}}{J_V}\overline{\omega} \\ \dot{\overline{\omega}} = -K_{II}\overline{\omega} - \frac{i_{fd}}{J_V}(\omega_W - \omega_{W,DES}) + K_O\sigma \\ \dot{\sigma} = -K_{III}\sigma - K_O\overline{\omega} + B_\sigma\zeta \\ \dot{\zeta} = K_d\omega_M - K_d\omega_{C,IN} - \dot{\Psi} \end{cases} \quad (74)$$

Choosing the CLF as given by Equation (75) for the candidate Lyapunov function in Equation (76) ensures the stability of the system Equation (74) by making the derivative of the Lyapunov function Equation (76) negative definite as evident from Equation (77).

$$\Gamma = \omega_{M,des} = \frac{1}{K_d}(K_d\omega_{C,IN} + \dot{\Psi} - \beta_\sigma\sigma - K_{IV}\xi) \quad (75)$$

-continued $$V_4 = \frac{1}{2}(\omega_W - \omega_{W,DES})^2 + \frac{1}{2}(\bar{\omega})^2 + \frac{1}{2}(\sigma)^2 + \frac{1}{2}(\zeta)^2 \quad (76)$$

$$\dot{V}_4 = -K_I(\omega_W - \omega_{W,DES})^2 - K_{II}(\bar{\omega})^2 - K_{III}(\sigma)^2 - K_{IV}(\zeta)^2 \quad (77)$$

The last back-stepping change of variable is considered as Equation (78) which transforms the systems of Equations (23) and (74) to Equations (79A) and (79B).

$$\xi = \omega_M - \omega_{M,des} = \omega_M - \Gamma \Rightarrow \dot{\xi} = \dot{\omega}_M - \dot{\Gamma} \quad (78)$$

$$\begin{cases} \dot{\omega}_W = -K_I(\omega_W - \omega_{W,DES}) + \frac{i_{fd}}{J_V}\bar{\omega} \\ \dot{\bar{\omega}} = -K_{II}\bar{\omega} - \frac{i_{fd}}{J_V}(\omega_W - \omega_{W,DES}) + K_O\sigma \\ \dot{\sigma} = -K_{III}\sigma - K_O\bar{\omega} + B_\sigma\zeta \end{cases} \quad (79A)$$

$$\begin{cases} \dot{\zeta} = -K_{IV}\zeta - B_\sigma\sigma + K_d\xi \\ \dot{\xi} = \frac{1}{J_M}(T_M - (\Psi + \zeta)) - \dot{\Gamma} \end{cases} \quad (79B)$$

If we now consider the motor torque as being given by Equation (80) then this makes the derivative of the candidate Lyapunov function Equation (81) negative definite as follows from Equation (82A) which clearly ensures asymptotic stability of the dynamical system Equation (79) as evident from Equation (82B). Accordingly, the motor torque in Equation (80) is equivalent to Equation (83).

$$T_M = (\Psi + \zeta) + J_M(-K_d\zeta + \dot{\Gamma} - K_V\xi) \quad (80)$$

$$V_5 = \frac{1}{2}(\omega_W - \omega_{W,DES})^2 + \frac{1}{2}(\bar{\omega})^2 + \frac{1}{2}(\sigma)^2 + \frac{1}{2}(\zeta)^2 + \frac{1}{2}(\xi)^2 \quad (81)$$

$$\dot{V}_5 = -K_I(\omega_W - \omega_{W,DES})^2 - K_{II}(\bar{\omega})^2 - K_{III}(\sigma)^2 - K_{IV}(\zeta)^2 - K_V(\xi)^2 \quad (82A)$$

$$(\omega_M, \bar{\omega}, \sigma, \zeta, \xi) \to (\omega_M, 0, 0, 0, 0) \quad (82B)$$

$$T_M = T_d + J_M(-K_d(T_d - T_{d,des}) + \dot{\omega}_{M,des} - K_V(\omega_M - \omega_{M,des})) \quad (83)$$

4.4 Control Algorithm for Upshift

In addition to the control strategy presented in Section 4, the gearshift control strategy of the transmission may be considered as consisting of two phases, a torque phase and an inertia phase. In the torque phase, the normal brake forces are controlled and the brakes are switched. At the beginning of the torque phase, the off-going brake is completely engaged and the on-going brake is completely released, and at the end of the torque phase the off-going brake is completely released and the on-going brake is slipping. This switching between brakes should be done smoothly. To have a smooth switching between these brakes, at the beginning of this phase a slip controller is activated on the ring brake.

This controller does not let the ring rotate more than a predetermined negative speed or any measurable negative speed as close as possible to zero (the ring has the tendency to rotate in negative direction) and at the same time the normal brake force of the sun is ramped up. Ramping up the normal brake force on the sun decreases the normal brake force of the ring brake which is controlled by the slip controller. This is because the ramping up in the normal force of the sun rotates the ring in the positive direction and the normal force of the ring brake should be decreased to bring it back to the desired value. By ramping up the normal brake force of the sun, the brake force of the ring gradually decreases to zero and stays at zero. The ramping up of the normal brake force on the sun should be up to the point that the slip controller of the ring be deactivated (or a bit more to make sure that the slip controller on the ring is completely deactivated). In the next phase, which is the inertia phase, the speed of the motor is matched with the speed of the driveline in the second gear and by controlling the normal brake force of the sun, the output speed and torque of the transmission could be controlled. At the end of the inertia phase, which is also the end of gear shifting, the normal brake force is ramped up to lock the sun.

During the torque phase, the speed of the motor may be controlled by a PID controller within some embodiments of the invention. The input error of the PID controller is the difference between the desired speed and the speed of the motor and output of the PID controller is the required electromagnetic torque of the motor.

4.5 Control Algorithm for Downshift

The downshift algorithm may be similar to the upshift algorithm although it will typically differ in the order of the algorithm. In the upshift, the algorithm starts with the torque phase and it ends with the inertia phase. In the downshift, the algorithm is generally started with the inertia phase and ended with the torque phase. Designing the controller for the downshift is almost the same as upshift. For example, an H-infinity ($H_\infty$) controller could be designed for the inertia phase with a combination of a PID controller and Lyapunov-based controller for the torque phase.

5. Simulation and Experimental Results

Figure 5:
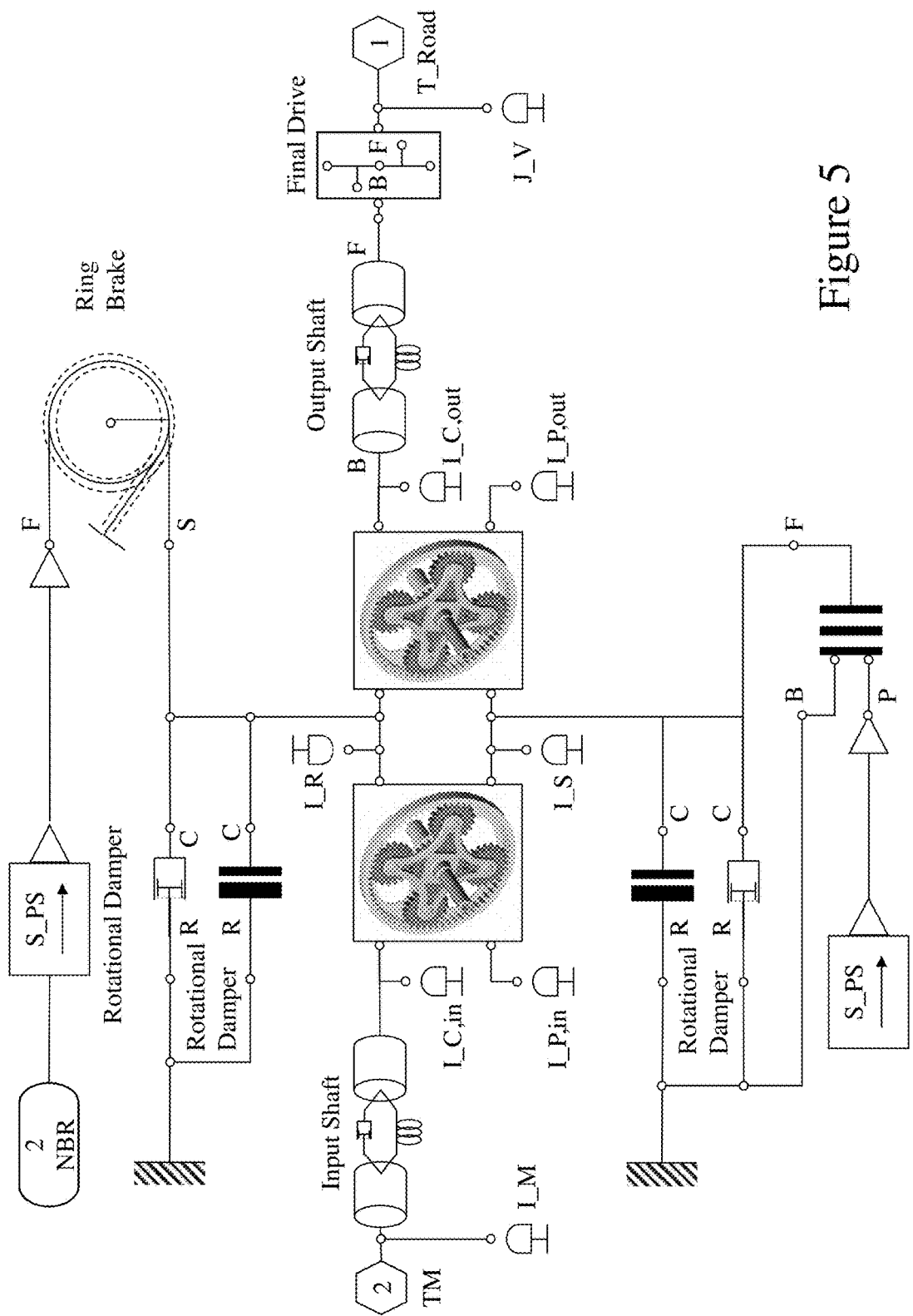
FIG. 5 depicts a driveline model MATLAB/Simulink by utilizing SimDriveLine components for a two-speed transmission according to an embodiment of the invention.

In the simulation analysis, the driveline of an electric vehicle equipped with the transmission according to an embodiment of the invention, as depicted in FIG. 1, has been modeled using MATLAB/Simulink® by utilizing the SimDriveLine library. The MATLAB/Simulink® model is depicted in FIG. 5. The experimental apparatus shown in FIG. 6 was developed at the Centre for Intelligent Machines (CIM) of McGill University and is composed of two planetary gear sets with common ring and common sun gears. The ratios of the first and the second planetary gears, as mentioned in Section 2, are $R_1=2$ and $R_2=4$, respectively. Two motors are connected to the input and output carriers of the transmission, where the motor connected to the input carrier replaces the main traction motor in the vehicle, and the motor connected to the output carrier is used to mimic the loads on the vehicle. The traction and load motors are identical, with a rated torque of 2.1 Nm, rated speed of 314 rad/s and moment of inertia of $5.9 \times 10^{-5}$ kg·m². The brake actuators are linear solenoids for which the relation between the applied current to the solenoid and the resulting force in 5 mm air gap was measured experimentally and the fitted curve to the experimental data is given by Equation (84) where F is the magnetic force of the solenoid in newtons and I is the applied current in amperes.

$$F = 8.097I^3 + 47.73I^2 - 21.13I \quad (84)$$

Figure 6:
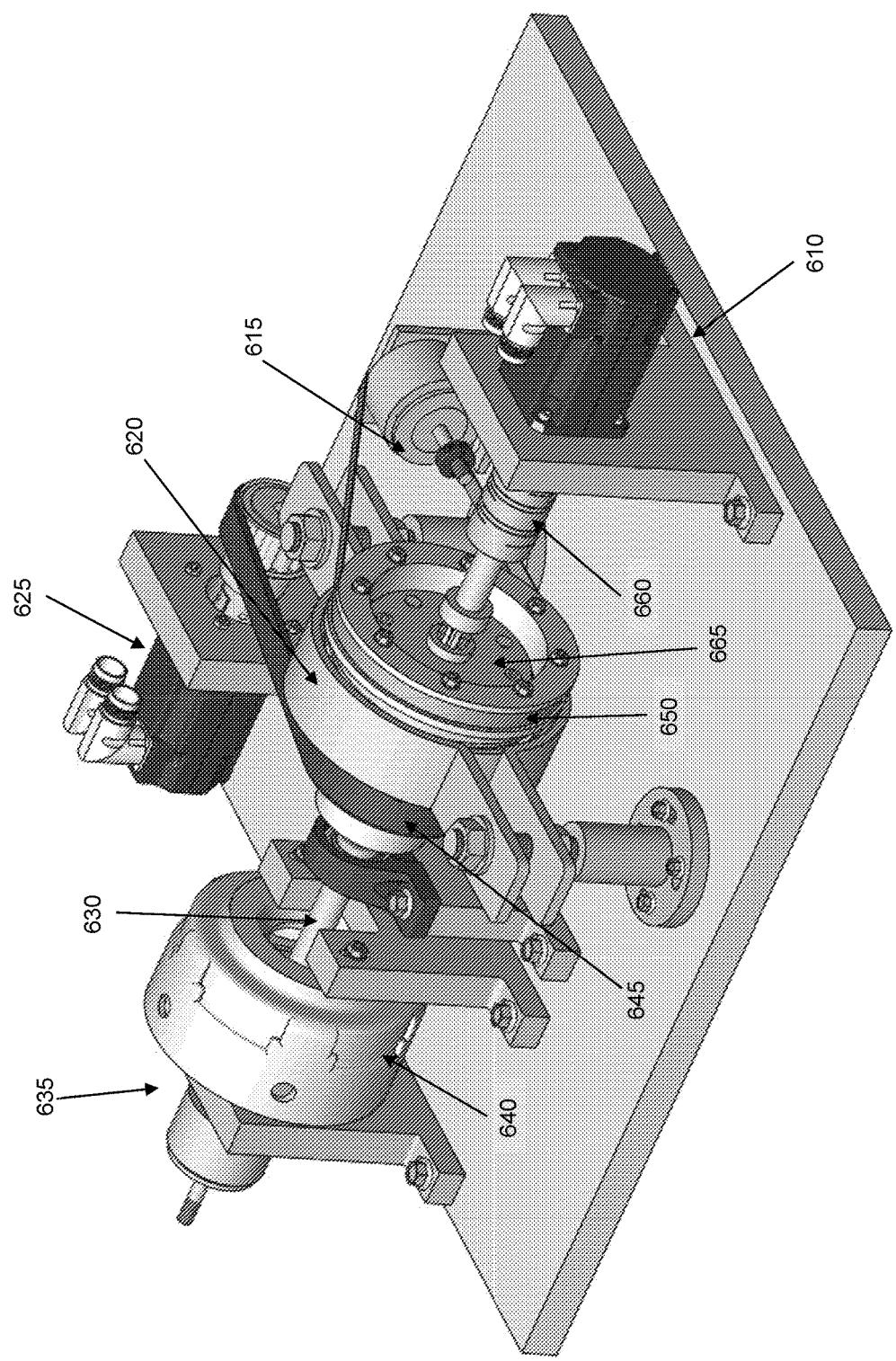
FIG. 6 depicts an experimental testbed for a two-speed transmission according to an embodiment of the invention.
Figure 7:
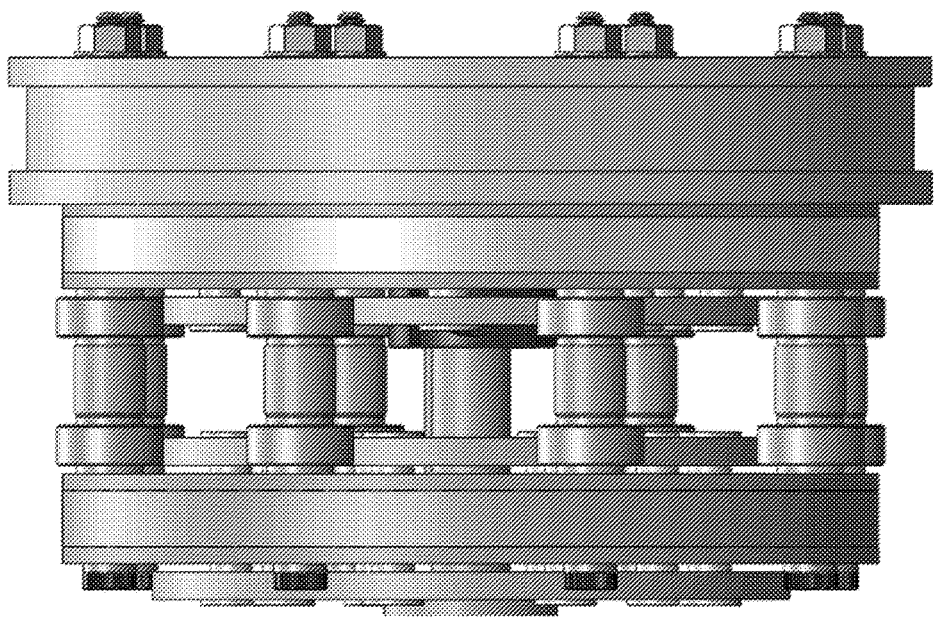
FIG. 7 depicts ring and sun gears mounted on the sets of ball bearings for a two-speed transmission according to an embodiment of the invention.
Figure 7:
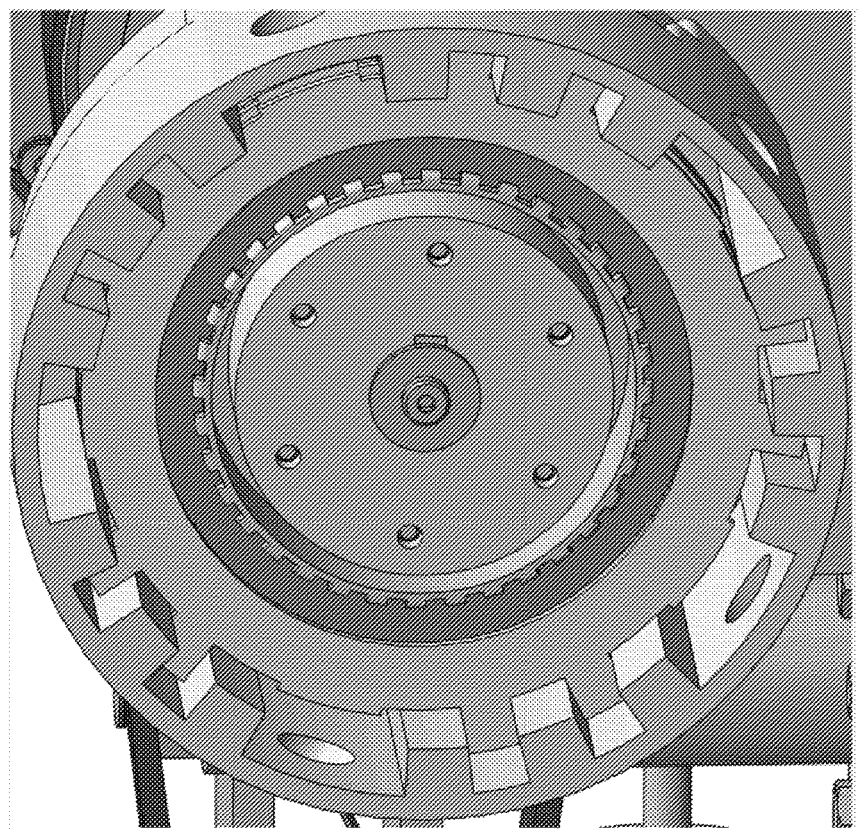

The brake of the sun is designed to be of the multi-plate brake type with 4 friction surfaces illustrated in FIG. 7A. The brake of the ring gear is designed to be of the band brake type with the wrap angle 4.014 (rad) which is shown in FIG. 7B. For the experimental apparatus depicted in FIG. 6, the values of the mass and moment of inertia of the components, the Coulomb and viscous friction models, and the coefficient of the friction of the brakes are estimated based on the time domain input-output data in MATLAB System Identification Toolbox. The stiffness and damping parameters of the input and output shafts are acquired from the datasheets and the radii of the drum of the band brake, the brake plates and the gears are obtained by direct measurements. The mass and moment of inertia of the components were verified with their 3D CAD models. The obtained parameters are listed in Table 2.

TABLE 2

Parameters of the Experimental Apparatus for Embodiment of the Invention

| | | | | | |
|---|---|---|---|---|---|
| $r_{R,IN}$ (m) | 6e-2 | $I_R$ (kg · m$^2$) | 3e-3 | $\mu_P$ | 0.14 |
| $r_{R,OUT}$ (m) | 6e-2 | $I_S$ (kd · m$^2$) | 8e-4 | $\mu_D$ | 0.18 |
| $r_{S,IN}$ (m) | 3e-2 | $I_{C,IN}$ (kg · m$^2$) | 1.4e-3 | n | 2 |
| $r_{S,OUT}$ (m) | 15e-3 | $I_{C,OUT}$ (kg · m$^2$) | 6e-3 | $\theta_D$ (rad) | 4.014 |
| $r_{P,IN}$ (m) | 15e-3 | $I_{P,IN}$ (kg · m$^2$) | 6.08e-6 | $R_i$ (m) | 0.054 |
| $r_{P,OUT}$ (m) | 22.5e-3 | $I_{P,OUT}$ (kg · m$^2$) | 3.12e-5 | $R_o$ (m) | 0.0675 |
| $C_R$ (Nm · s/rad) | 0.0024 | $m_{P,IN}$ (kg) | 0.0512 | $R_D$ (m) | 0.0755 |
| $C_S$ (Nm · s/rad) | 0.00105 | $m_{P,OUT}$ (kg) | 0.12113 | $T_{Rf}$ (Nm) | 0.33 |
| $K_D$ (Nm/rad) | 161.84 | $K_O$ (Nm/rad) | 150 | $T_{Sf}$ (Nm) | 0.13 |
| $J_M$ | 5.9e-5 | $J_V$ (kg · m$^2$) | 3.17e-4 | $i_{fd}$ | 1 |

The simulation and experimental tests were carried out for a sample drive cycle with a duration of 50 s which has one upshift at t=16 s and one downshift at t=26 s. The resisting torque of the load motor is considered to be a quadratic function of the angular velocity with the equation $T_V=0.0004\omega_W^2$ Nm in order to mimic the aerodynamic drag torque on the vehicle which is the dominant resisting load at high speeds.

The designed back-stepping controller with the parameters given in Table 2 is applied to both experimental and simulation tests to maintain the output torque and the output speed constant. The applied brake forces for both experimental and simulation tests are shown in FIG. 8 with $N_{BS,max}$=110N and $N_{BR,max}$=30N. For practical reasons, instead of direct measurement of the torques on the input and the output shafts, a stochastic observer was employed in order to estimate $T_d$ and $T_O$, from the dynamical Equation (23) using the measured values of the states $\omega_M$ and $\omega_W$ and the known values of the input torques $T_M$, $T_{BS}$, and $T_{BR}$.

Figure 9:
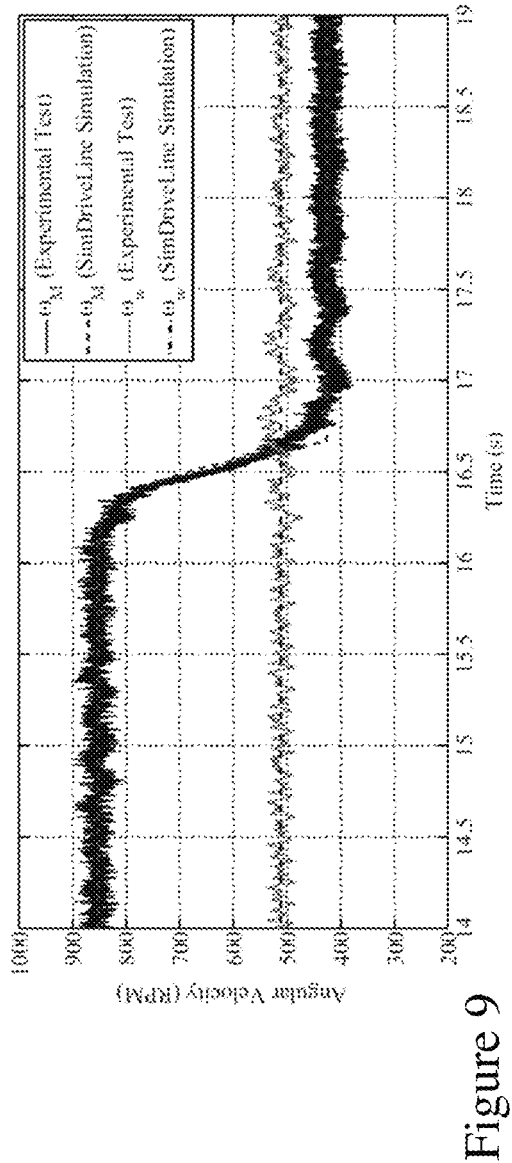
FIG. 9 depicts motor and output speeds for an upshift operation for a two-speed transmission according to an embodiment of the invention.

For clarity of the figures, the results of the mathematical model are not shown because they exactly fit the simulation results from the SimDriveLine model. The simulation and experimental results for the upshift process are illustrated in FIGS. 9 to 12, respectively, and the results of the downshift operation are demonstrated in FIGS. 13 to 16, respectively. The frequency of data acquisition for both experimental and simulation tests are 1 kHz. The motor ($\omega_M$) and output ($\omega_W$) speeds during the upshift and downshift operations are illustrated in FIGS. 9 and 13, respectively. It is evident that during the synchronization of the motor with the speed of the driveline in the target gear, the designed controller effectively maintained the output speed at a point where the oscillation of the output speed at 511 rpm is suppressed in the simulation analysis, and in the experimental test it remains less than 10%. It should be noted that, unlike the torque and inertia phases in controlling DCTs and ATs, in the transmission according to an embodiment of the invention the synchronization of the motor speed and switching the brakes happens simultaneously as discussed in Section 4.

Figure 8A:
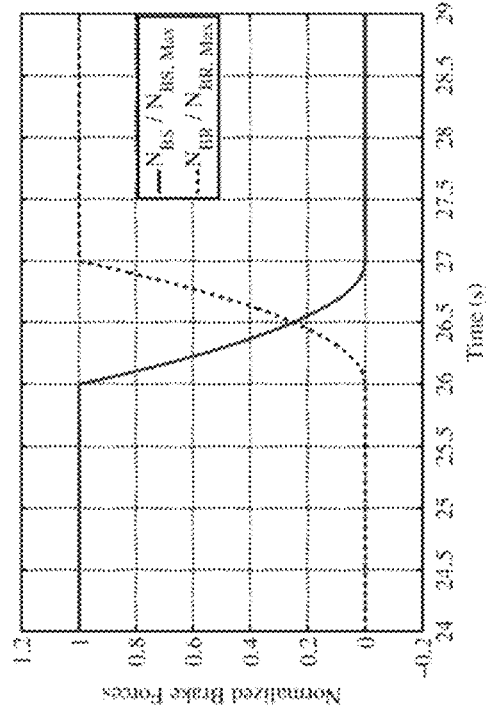
FIGS. 8A and 8B depict normalized brake force profiles applied to both experimental and simulation tests during the upshift and downshift operations for a two-speed transmission according to an embodiment of the invention.
Figure 8B:
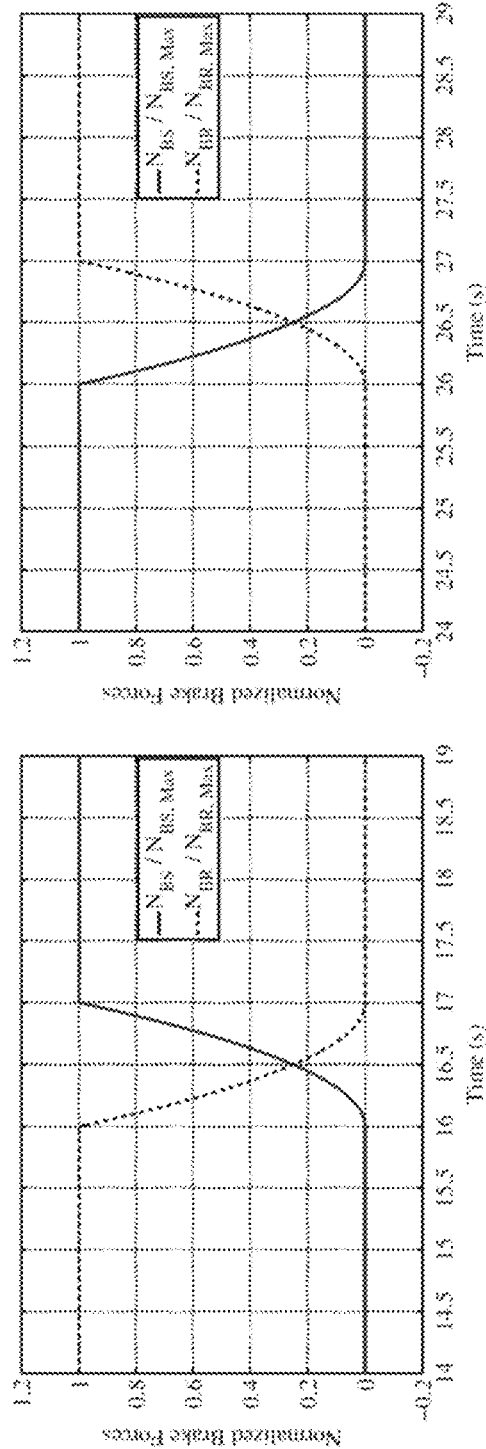

In FIGS. 8A and 8B, disengagement of the off-going brake and engagement of the oncoming brakes start at t=16s and t=26s for the upshift and downshift operations as depicted, respectively. However, the synchronization of the motor starts later than t=16s and t=26s in FIGS. 9 and 13.

This delay corresponds to the time reserved for the preparation of the oncoming and off-going brakes. In other words, this delay is related to pre-fill the oncoming brake and to bring the off-going brake to slip mode. By considering the time of preparation of the oncoming and off-going brakes in the shifting time, the respective duration of the upshift and processes was approximately 0.6s and 0.8s in the simulation, and about 0.8s and 1s in the experimental tests.

Figure 10:
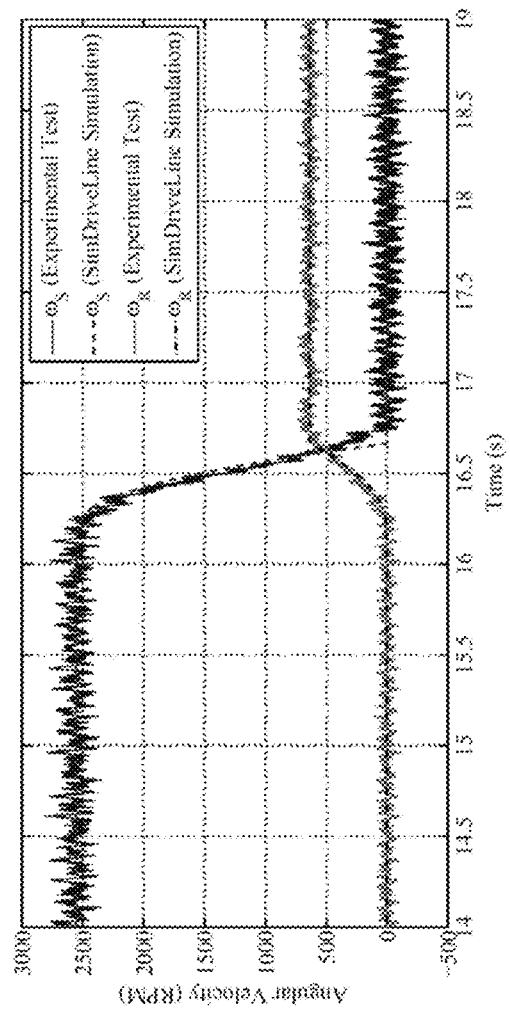
FIG. 10 depicts ring and sun speeds for an upshift operation for a two-speed transmission according to an embodiment of the invention.
Figure 14:
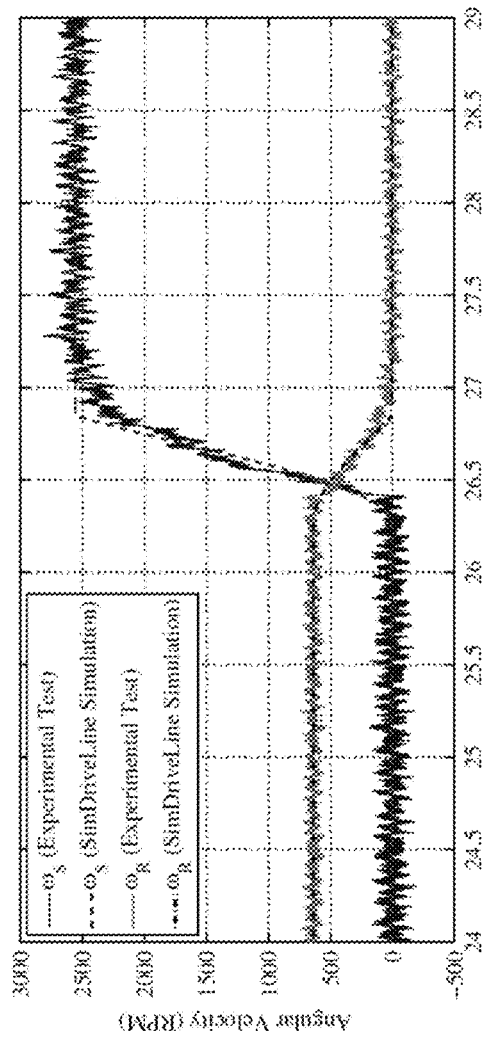
FIG. 14 depicts the ring and sun speeds for a downshift operation for a two-speed transmission according to an embodiment of the invention.

The angular velocities of the ring ($\omega_R$) and sun ($\omega_S$) gears for the upshift and downshift operations are shown in FIGS. 10 and 14, respectively. It can be seen that during the upshift process the sun gear is grounded and the ring gear is released and the opposite case holds for the downshift operation.

Figure 11:
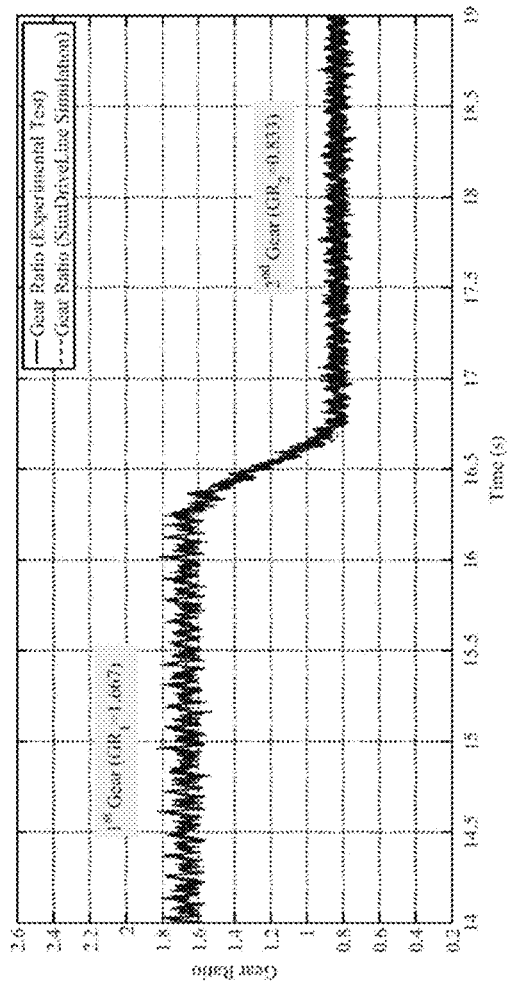
FIG. 11 depicts the variation in the gear ratio (GR) during an upshift operation for a two-speed transmission according to an embodiment of the invention.
Figure 15:
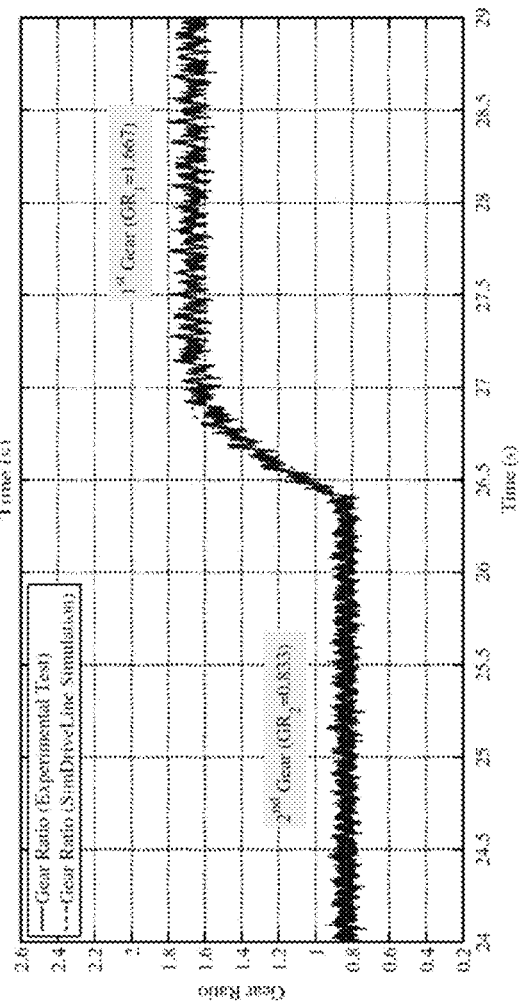
FIG. 15 depicts the variation in gear ratio (GR) for a downshift operation for a two-speed transmission according to an embodiment of the invention.

The variation of the gear ratio for the upshift and downshift processes is demonstrated in FIGS. 11 and 15, respectively. This variation can be used as a criterion to measure the duration of the gear changing process.

Figure 12:
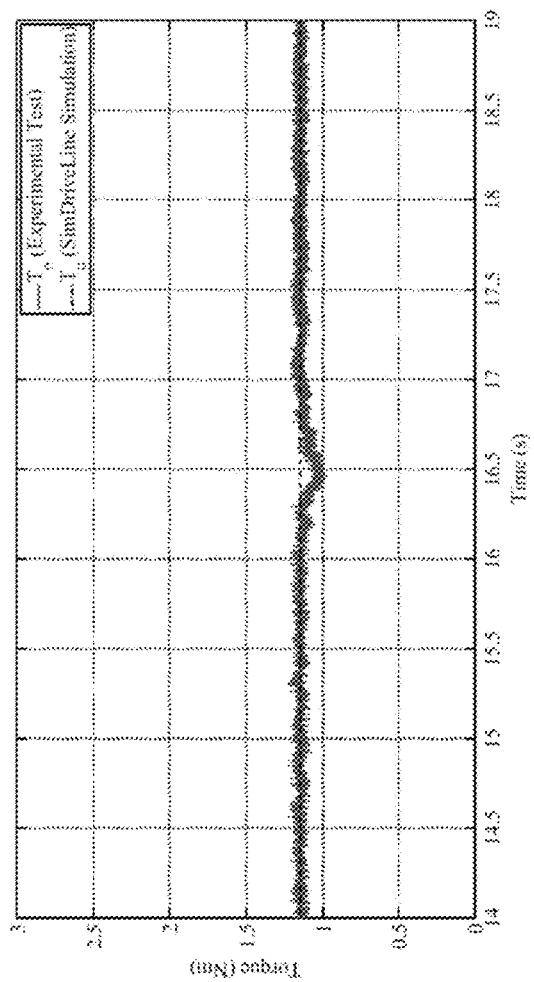
FIG. 12 depicts the output torque during an upshift operation for a two-speed transmission according to an embodiment of the invention.
Figure 13:
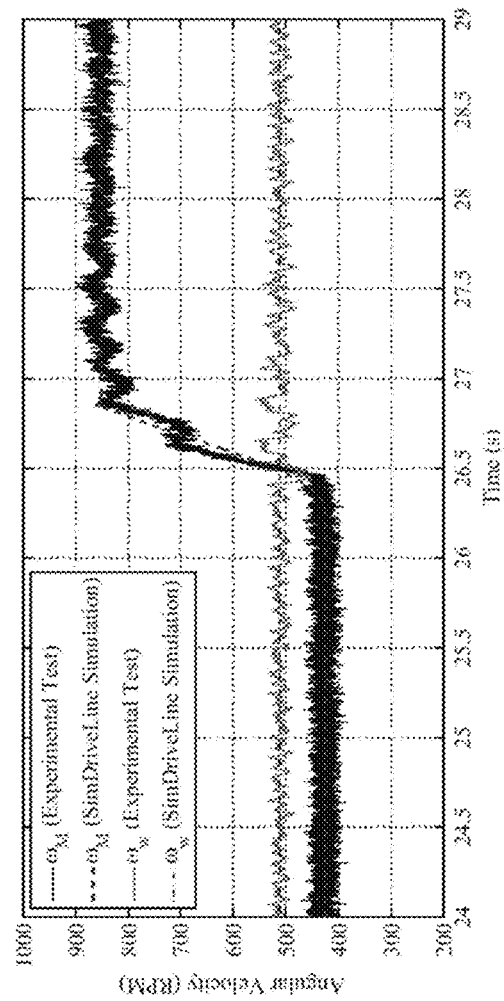
FIG. 13 depicts the motor and output speeds for a downshift operation for a two-speed transmission according to an embodiment of the invention.
Figure 16:
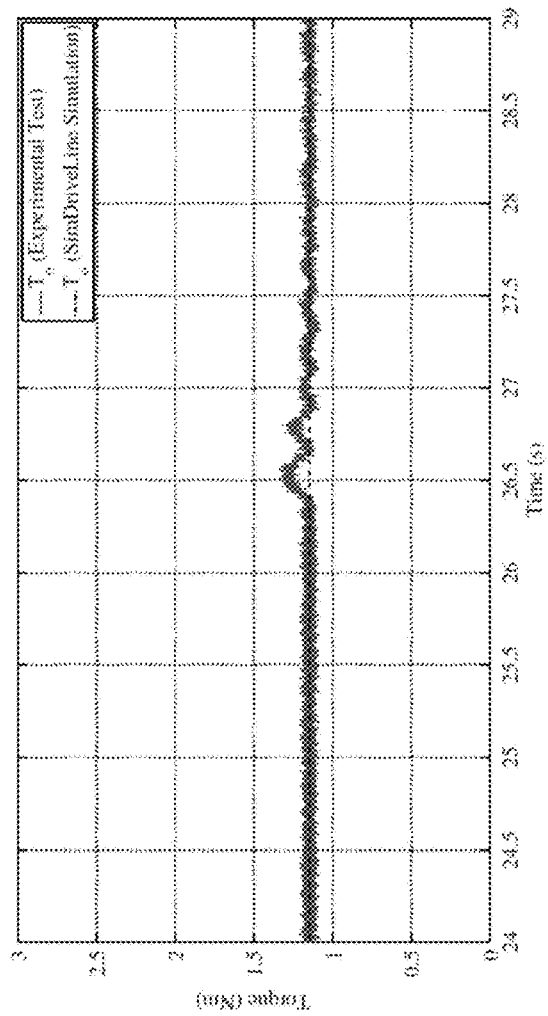
FIG. 16 depicts the output torque for a downshift operation for a two-speed transmission according to an embodiment of the invention.

The output torque for the upshift and downshift operations is illustrated in FIGS. 12 and 16, respectively. It can be seen that the oscillation of the output torque during the gear changing process in the simulation is negligible and in the experimental test it remains less than 15%. The oscillation of the output torque and output speed and the increase in the shifting time in the experimental test in comparison to simulation results come from un-modeled uncertainties in the dynamical model of the system and actuators, such as un-modeled uncertainties in the complex friction model of the internal gears, the variation of the viscosity of the transmission oil used for the experimental test by increasing the temperature, uncertainties in the position of the solenoid's plunger due to compression of the multi-brake plates, deformation of the band which results in the deviation of $T_{BS}$ and $T_{BR}$ from the desired values, and un-modeled uncertainties in the resistance of the solenoid actuators which comes from the variation of the temperature of the coil which causes uncertainties in the resulting force.

Transitions between slip and stick phases at the end of gear shifting operation in the experimental results are different from the theoretical results (i.e., the simulation results) in the upshift process in FIGS. 9 to 11 and the downshift in FIGS. 13 to 15. These differences are due to the consideration of friction torques in simulations in the form of Coulomb and Stribeck friction, which is not an exact representative of the behavior of frictional torques of the brakes in the experimental testbed.

Figure 17:
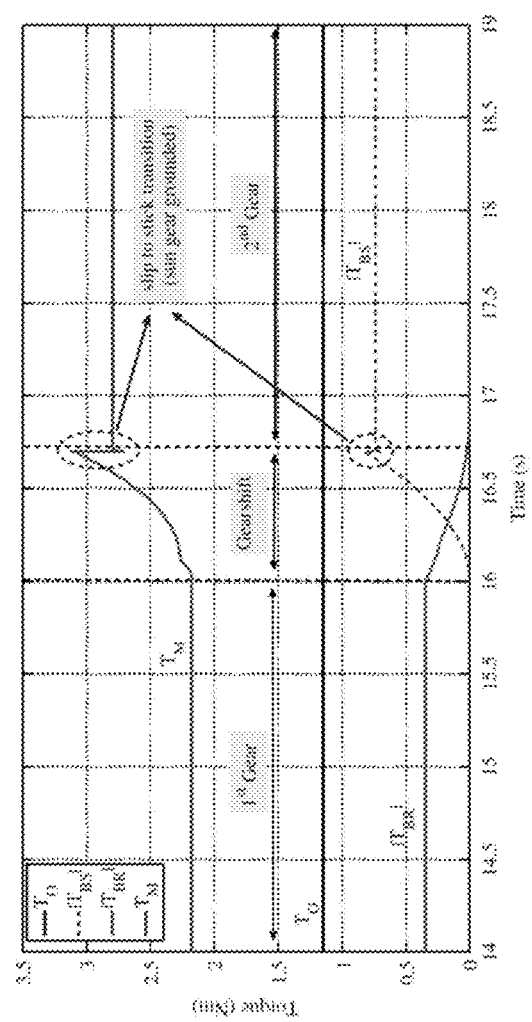
FIG. 17 depicts simulated brake friction torque and motor torque for an upshift operation for a two-speed transmission according to an embodiment of the invention.
Figure 19C:
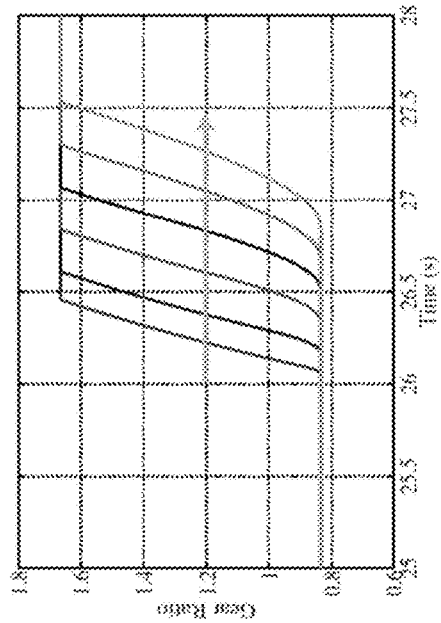
Figure 19D:
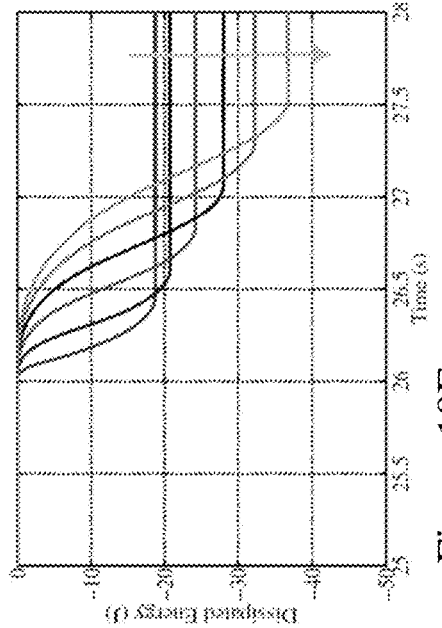
Figure 19E:
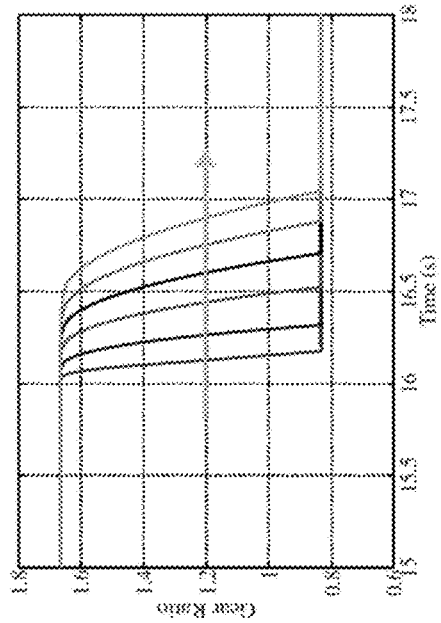
Figure 19F:
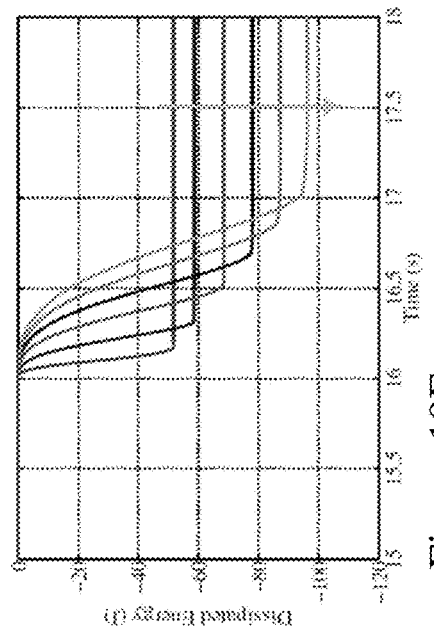

Brake friction torque, the motor torque applied to both the computer model and the experimental setup, and the simulated output torque of the transmission are illustrated in FIGS. 17 and 18 for the upshift and downshift operations, respectively. As illustrated in these figures, the additional motor torque required for the compensation of the slip friction on the brakes disappears at the end of gear shifting process when the oncoming brake comes to rest in the stick mode.

The effect of engagement and disengagement intervals of the oncoming and off-going brakes from 0.1s to 1.5s (0.1, 0.3, 0.6, 0.9, 1.2, and 1.5 seconds) on the shifting time and the energy dissipation for the upshift and downshift processes are illustrated in FIG. 19. It can be seen that increasing the engagement and disengagement intervals from 0.1s to 1.5s increases the shifting time from 0.18s to 1.04s for the upshift process and 0.46s to 1.53s for the downshift operation. The growth of the energy dissipation caused by the internal brakes of the transmission during the gear changing process are from 51.7 J to 96.23 J and from 18.8 J to 36.83 J for the upshift and downshift operations, respectively. This verifies that the smallest interval i.e., the case with sudden engagement and disengagement of the oncoming and off-going brakes, corresponds to the minimum shifting time and minimum dissipated energy, as indicated by the results of the Pontryagin Minimum Principle in Section 4.

6. Observer Design

Within the state space model of the two-speed seamless transmission system presented supra the full state dynamics of the system are given by Equations (23A) to (23F) respectively wherein the only measurable states are $\omega_M$ and $\omega_W$ where, for practical reasons, no torque measurements are made on the input and the output shafts and no speed measurement is carried out on the sun and ring gears. Accordingly, in this section a state observer is designed to estimate unavailable states $T_d$, $\omega_S$, $\omega_R$, and $T_O$ by knowledge of the inputs $T_M$, $T_{BS}$, $T_{Sf}$, $T_{BR}$, and $T_{Rf}$ and the outputs $\omega_M$ and $\omega_W$ of the system. Here, for simplicity, the state estimation problem is studied for the case when $\theta_{road}=0$.

Two different approaches are presented, including the deterministic Luenberger observer and stochastic Kalman filter, and used to design such an observer. The estimated states from the two approaches are compared together in practice.

6.1 Deterministic Luenberger Observer

Within this section, a Luenberger observer is designed for the system with full state dynamics given by Equations (23A) to (23F) for the case when there is no plant or measurement noise. The Equation state dynamic set Equations (23A) to (23F) can be rewritten as given by Equation (85), where the states x(t), inputs u(t), and outputs y(t) are given by Equations (86) to (88), respectively.

$$x(t) = A\,x(t) + B \cdot u(t) + \phi(y(t)) \quad x(t) \in \mathbb{R}^6 \qquad (85)$$
$$y(t) = C \cdot x(t) \quad\quad\quad\quad\quad y(t) \in \mathbb{R}^2$$

$$x(t) = \begin{bmatrix} \omega_M \\ T_d \\ \omega_S \\ \omega_R \\ T_O \\ \omega_W \end{bmatrix} \qquad (86)$$

$$u(t) = \begin{bmatrix} T_M \\ T_{BS} + T_{Sf} \\ T_{BR} + T_{Rf} \end{bmatrix} \qquad (87)$$

$$y(t) = \begin{bmatrix} \omega_M \\ \omega_W \end{bmatrix} \qquad (88)$$

The matrices A, B, C, and $\phi(y(t))$ within Equation (85) these are given by Equations (89) to (92).

$$A = \begin{bmatrix} 0 & \frac{-1}{J_M} & 0 & 0 & 0 & 0 \\ K_d & 0 & \frac{-K_d}{R_1+1} & \frac{-K_d R_1}{R_1+1} & 0 & 0 \\ 0 & \frac{c}{a} & \frac{-C_S \tau}{a} & \frac{-C_R \lambda}{a} & \frac{-d}{a} & 0 \\ 0 & \frac{e}{a} & \frac{-C_S \lambda}{a} & \frac{-C_R \gamma}{a} & \frac{-f}{a} & 0 \\ 0 & 0 & \frac{K_O}{R_2+1} & \frac{K_O R_2}{R_2+1} & 0 & -i_{fd} K_O \\ 0 & 0 & 0 & 0 & \frac{i_{fd}}{J_V} & 0 \end{bmatrix} \qquad (89)$$

$$B = \begin{bmatrix} \frac{1}{J_M} & 0 & 0 \\ 0 & 0 & 0 \\ 0 & \frac{\tau}{a} & \frac{-\lambda}{a} \\ 0 & \frac{-\lambda}{a} & \frac{\gamma}{a} \\ 0 & 0 & 0 \\ 0 & 0 & 0 \end{bmatrix} \qquad (90)$$

$$C = \begin{bmatrix} 1 & 0 & 0 & 0 & 0 & 0 \\ 0 & 0 & 0 & 0 & 0 & 1 \end{bmatrix} \qquad (91)$$

$$\phi(y(t)) = \begin{bmatrix} 0 \\ 0 \\ 0 \\ 0 \\ 0 \\ -R_W \left( \frac{1}{2} \rho R_W^2 \omega_W^2(t) C_d A_f + K_r m_V g \right) \\ \hline J_V \end{bmatrix} \qquad (92)$$

In the Equation (85), the non-linear term $\phi$ is a function of y(t), hence using linear output injection to design an observer of the form given by Equation (93) results in linear error dynamics of the form given by Equation (94).

$$\dot{\hat{x}}(t) = A \cdot \hat{x}(t) + B \cdot u(t) + \phi(y(t)) + L(y - \hat{y}) \quad \hat{x}(t) \in \mathbb{R}^6$$

$$\hat{y}(t) = C \cdot \hat{x}(t) \quad \hat{y}(t) \in \mathbb{R}^2 \qquad (93)$$

$$e(t) = (A - LC)e(t); \; e(t) = \hat{x}(t) - x(t) \qquad (94)$$

The eigenvalues of the matrix A−LC can be assigned arbitrarily by appropriate choice of observer gain L. This makes the error converge to zero exponentially quickly. Hence, the problem of designing an observer for the non-linear system given by Equations (23A) to (23F) is transformed to design the observer gain L for the pair (A,C) of a linear system and using the identical gain (L) in the non-linear observer dynamics in Equation (93). A sufficient condition for the existence of such L in Equation (94) is that (A,C) is observable. It can be shown that with the parameters of the system given in Table 4, the observability matrix for (A,C) is full rank and such L exists.

6.2. Kalman-Bucy Filter

By considering the plant noise w(t) and the measurement noise v(t), then Equation (85) can be represented by Equation (95). It is assumed that w(t) and v(t) are uncorrelated, zero-mean, and Gaussian white-noise stochastic processes as defined by Equation (96) where $\Im|x|$ is the expected value of the random variable x, Q denotes the strength of the plant noise, R is the strength of the measurement noise and $\delta$ is the Dirac delta function.

$$\dot{x}(t)=A\cdot x(t)+B\cdot u(t)+\phi(y(t))+w(t)\ x(t)\in\Re^6$$

$$y(t)=C\cdot x(t)+v(t)\ y(t)\in\Re^2 \quad (95)$$

$$\Im|w(t)v^T(\tau)|=0\ \forall t,\tau$$

$$\Im|w(t)|=0$$

$$\Im|w(t)w^T(\tau)|=Q\delta(t-\tau)\ Q=Q^T>0$$

$$\Im|v(t)|=0$$

$$\Im|v(t)v^T(\tau)|=R\delta(t-\tau)\ R=R^T>0 \quad (96)$$

The goal of the optimal observer is to minimize the expected estimation error by knowing the stochastic features of the plant and measurement noises. Designing an observer of the form given by Equation (97) results in the error dynamics $\tilde{x}=x-\hat{x}$ as given Equation (98) where $L'=P(t)C^TR^{-1}$ and P(t) is the solution of the Riccati equation given by Equation (99) and P(t) is an approximation of the covariance matrix given by Equation (100).

$$\dot{\hat{x}}(t)=A\cdot\hat{x}(t)+B\cdot u(t)+\phi(y(t))+L'(y-C\hat{x})\ \hat{x}(t)\in\Re^6$$

$$\hat{y}(t)=C\cdot\hat{x}(t)\ \hat{y}(t)\in\Re^2 \quad (97)$$

$$\dot{\tilde{x}}(t)=(A-L'C)\tilde{x}(t)+w(t)-L'v(t) \quad (98)$$

$$\dot{P}(t)=AP(t)+P(t)A^T+Q-P(t)C^TR^{-1}CP(t) \quad (99)$$

$$\Im[(x(t)-\hat{x}(t))(x(t)-\hat{x}(t))^T] \quad (100)$$

It can be shown that for symmetric positive definite matrices Q and R when the pair (A,C) is observable, a positive definite P(t) exists and it is the solution of the Equation (99). It can be proven that with L' given by $L'=P(t)C^TR^{-1}$ the origin of error dynamics in Equation (96) is exponentially stable.

6.3 Simulation and Experimental Results

In order to assess the performance of the designed observers, the inventors employed the experimental apparatus as described supra and depicted in FIG. 6. Accordingly, the experimental configuration comprises a dual-stage planetary gear set with common sun and common ring gears, a flexible input shaft which connects the electric motor to the transmission, a flexible output shaft which transfers the output power of the transmission to the wheels and vehicle, a band brake mechanism to control the speed of the ring gear, and a multi-plate brake system to control the speed of the sun gear.

In the experimental apparatus, the traction and load motors are identical with the rated torque 2.1 Nm and the rated speed 314 rad/s. The load motor mimics the road load. The brake actuators are linear solenoids with the relation $F=-8.097I^3+47.73I^2-21.13I$ between the applied current to the solenoid and the resulting force in 5 mm air gap, where F is the magnetic force of the solenoid in Newtons and I is the applied current in Amperes. The system tested has the same parameters as defined in Table 2 except for those defined below in Table 3.

TABLE 3

| Experiment System Parameter Variations from Table 2 | | | |
|---|---|---|---|
| $C_R$ (Nm · s/rad) | 0.0034 | n | 4 |
| | | $T_{Sf}$ (Nm) | 0.12 |

The performance of the proposed observers was verified with experimental and simulation tests. The tests are carried out for the sample drive cycle with an upshift operation during acceleration at t=6.7s. The estimated speed of the sun and ring gears is verified with experimental tests. However, the apparatus was not equipped with a torque sensor due to its high cost, which reflects low-cost EV deployments. The simulation model implemented in MATLAB/SimDriveLine was used to validate the estimated torques. The eigenvalues of the deterministic Luenberger observer are assigned to be $p=[-400\ -390\ -450\ -560\ -500\ -600]^T$. The stochastic Kalman-Bucy filter was designed by knowing the stochastic features of the plant and measurement noises.

Figure 20:
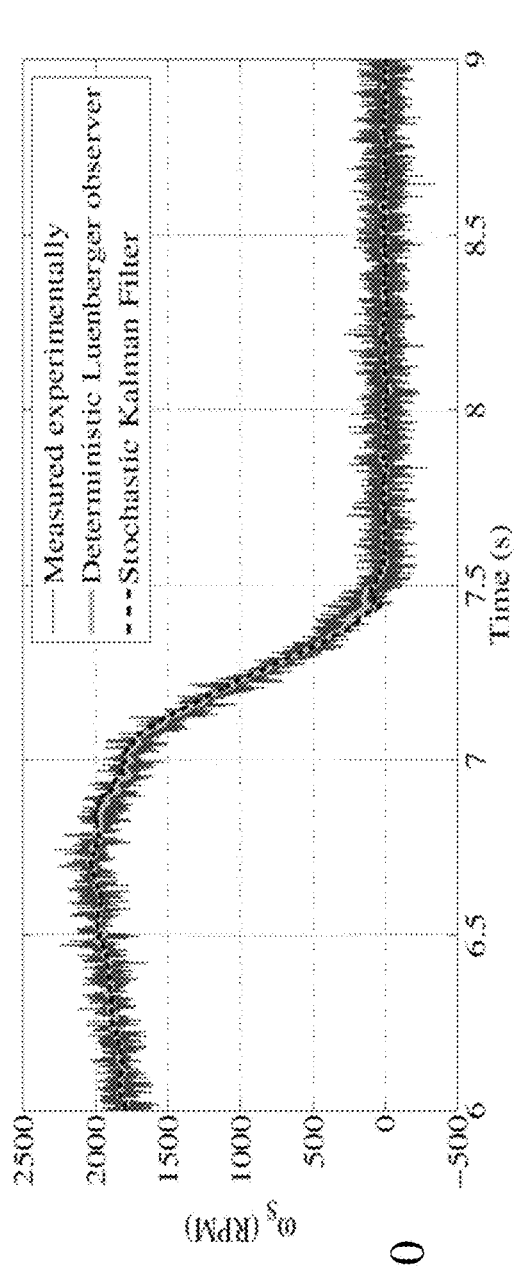
FIG. 20 depicts estimated and actual speed of the sun gear (upshift) established with an observer according to an embodiment of the invention.
Figure 21:
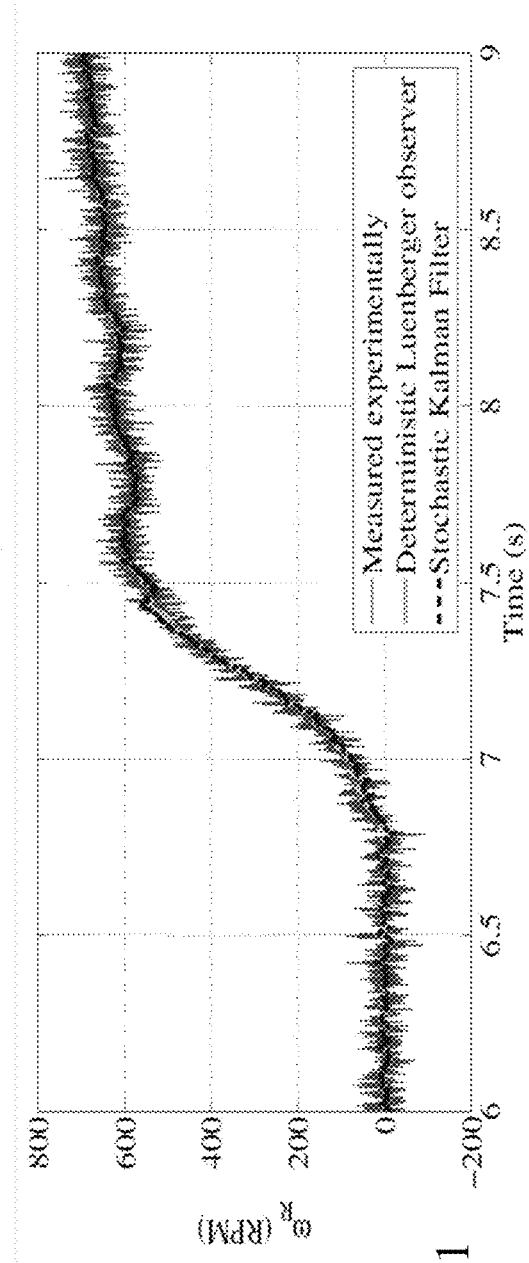
FIG. 21 depicts estimated and actual speed of the ring gear (upshift) established with an observer according to an embodiment of the invention.
Figure 22:
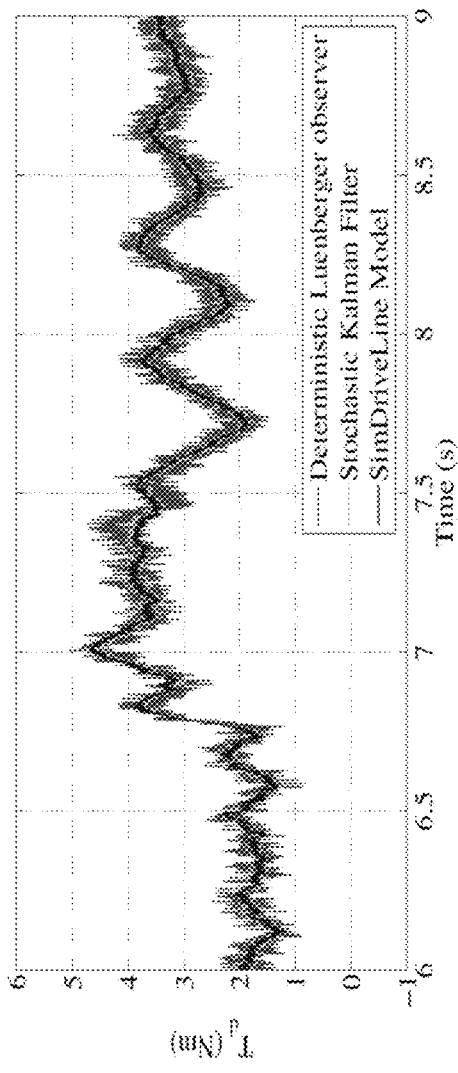
FIG. 22 depicts estimated torque of the input shaft (upshift) established with an observer according to an embodiment of the invention.
Figure 23:
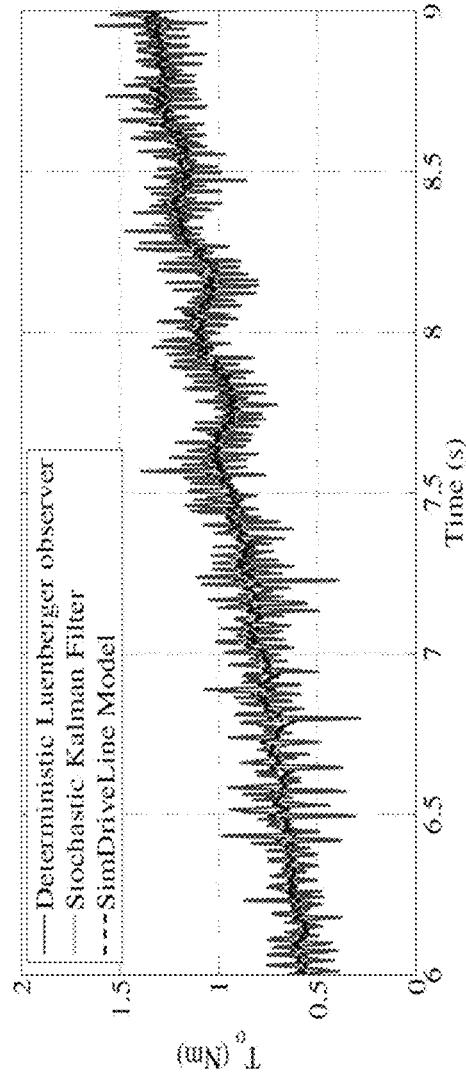
FIG. 23 depicts estimated torque of the output shaft (upshift) established with an observer according to an embodiment of the invention.

The estimated and measured speed of the sun and ring gear before, during, and after the upshift are depicted in FIGS. 20 and 21, respectively. According to these figures, it can be concluded that both the deterministic Luenberger observer and Kalman-Bucy filter effectively estimate the speed of the sun and ring gears, even during the sudden transition in the states caused by gear shift operation. It can be observed that the Kalman-Bucy filter provides a lower level of noise than the deterministic Luenberger observer. The estimated torque of the input and output shaft along with the measured torques from the SimDriveLine model for the upshift process are illustrated in FIGS. 22 and 23, respectively. According to the results, it can be observed that the Kalman-Bucy filter provides better estimation in terms of accuracy and noise rejection than the deterministic Luenberger observer. Experimental and simulation analysis showed that assigning the eigenvalues of the Luenberger observer further from the imaginary axis will increase the noise in the estimation dramatically and assigning these eigenvalues closer to the imaginary axis will increase the error in the state estimation considerably.

7. Summary

Within the preceding description, a novel, seamless two-speed transmission for electric vehicles is presented. Kinematic analysis of the transmission and achievable gear ratios is presented. The analytical dynamic model of the driveline of an electric vehicle equipped with the proposed transmission is derived based on kinematic analysis and by utilizing the torque balance and virtual work principle. Thereafter, the Pontryagin Minimum Principle is used to derive an optimal control law to minimize the shifting time and the energy dissipation during the gear changing process while keeping the output speed and output torque constant. The optimal control problem results in a bang-bang type control law for the oncoming and off-going brakes while the corresponding optimal trajectories for $T_d$ and $T_O$ maintain the output speed and output torque constant during the gear change. In order to provide a closed-loop controller based on the results of the Pontryagin Minimum Principle and due to the recursive and nonlinear dynamics of the driveline in Equation (23), the back-stepping method is applied to design a controller that tracks the optimal trajectories while relaxing the abrupt changes in the control inputs to cope with the actuator limitations.

Further, the inventors have established a deterministic Luenberger observer and a stochastic Kalman-Bucy filter designed to estimate the unmeasured states. The simulation and experimental results demonstrate that the stochastic Kalman-Bucy filter provides better estimation than the deterministic Luenberger estimator in terms of accuracy and noise rejection. In other words, the Kalman-Bucy filter provides an optimal observer which minimizes the expected estimation error by knowing the stochastic features of the plant and measurement noises.

It will be apparent to one skilled in the art that even though embodiments of the invention have been described and illustrated herein with respect to the use of two interconnected sun gears and two interconnected ring gears that would have the adequate outer and inner diameters, respectively, that alternatively a stepped sun gear and a stepped ring gear may employed.

It would be apparent to one skilled in the art that even though the embodiments of the invention have been described and depicted with respect to the ring and sun gears within the configurations shown that the ring and sun gear may be placed internally or externally by using additional intermediate gears. Accordingly, the two-speed transmission can be designed in a first configuration wherein within the first planetary gearbox each of the first sun gear and first ring gear may be external or internal and within the second planetary gearbox each of the second sun gear and the second ring gear may be external or internal to the two-speed transmission.

This would allow for the ring and sun gears to be external or internal gears depending on the design of the transmission and for the planet gears of each planetary gear set to have different steps and consequently can be meshed with sun and ring gears with different diameters. Accordingly, the planet gears of at least one of the first planetary gearbox and the second planetary gearbox may be stepped and can be meshed with their respective sun gear and ring gear that are similarly stepped with different diameters.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A two-speed transmission comprising:
a first planetary gearbox including a sun including at least one sun gear, a ring including at least one ring gear, first planet gears meshed with the sun and the ring, a first planet carrier operatively supporting the first planet gears, the first planet carrier being an input of the two-speed transmission;
a second planetary gearbox including the sun and the ring in common with the first planetary gearbox, second planet gears meshed with the sun and the ring, and a second planet carrier operatively supporting the second planet gears, the second planet carrier being an output of the two-speed transmission;
a sun brake for braking the sun; and
a ring brake for braking the ring;
wherein at least one of the sun and the ring includes two gears connected together, the two gears having different diameters for the transmission to have at least two speed ratios; and
wherein, a first of the speed ratios between the input and the output is provided by actuating the sun brake and by releasing the ring brake, and a second of the speed ratios, different than the first speed ratio, is provided by actuating the ring brake and by releasing the sun brake.

2. The two-speed transmission according to claim 1, wherein the sun brake and the ring brake are coupled and are actuated by a common actuator for providing at least one of upshifting- and downshifting.

3. The two-speed transmission according to claim 1, further comprising a controller operatively connected to the sun brake and the ring brake.

4. The two-speed transmission for a vehicle according to claim 3, wherein the controller is at least one of a minimum energy dissipation controller, a minimum shifting time controller, and a back-step controller.

5. The two-speed transmission according to claim 3, wherein the controller has a control algorithm for upshifting comprising an initial torque control phase followed by an inertia control phase.

6. The two-speed transmission according to claim 3, wherein the controller has a control algorithm for downshifting comprising an initial inertia control phase followed by a torque control phase.

7. The two-speed transmission for a vehicle according to claim 1, wherein the sun is a stepped gear having different diameters.

8. The two speed transmission according to claim 1, wherein the sun brake and the ring brake are actuated by solenoids.

9. The two speed transmission according to claim 1, wherein the sun brake and the ring brake are selected from a group consisting of multi-plate brakes, band brakes, and drum brakes.

10. The two speed transmission according to claim 1, wherein the sun has two sun gears of different diameters mounted on a common shaft for common rotation, and wherein the two ring gears have the same diameter.

11. The two speed transmission according to claim 10, further comprising a hub mounted on the common shaft and rotating integrally therewith, the sun brake engaging the hub.

12. The two speed transmission according to claim 1, wherein the ring brake engages a radially-outer side of the ring.

* * * * *